US012683309B2

(12) United States Patent
Fan et al.

(10) Patent No.: US 12,683,309 B2
(45) Date of Patent: Jul. 14, 2026

(54) HIGH-QUALITY, HIGH-SPEED CARD EDGE CONNECTOR

(71) Applicant: Amphenol Commercial Products (Chengdu) Co., Ltd., Chengdu (CN)

(72) Inventors: Jun Fan, Chengdu (CN); Tao Zeng, Chengdu (CN); Ki Ka Lau, Kowloon (HK)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 331 days.

(21) Appl. No.: 18/484,837

(22) Filed: Oct. 11, 2023

(65) Prior Publication Data

US 2024/0128667 A1 Apr. 18, 2024

(30) Foreign Application Priority Data

Oct. 12, 2022 (CN) ......................... 202211245277.1
Oct. 12, 2022 (CN) ......................... 202222680275.7

(51) Int. Cl.
*H01R 12/72* (2011.01)
*H01R 12/73* (2011.01)
*H01R 13/6583* (2011.01)

(52) U.S. Cl.
CPC ......... *H01R 12/725* (2013.01); *H01R 12/732* (2013.01); *H01R 13/6583* (2013.01)

(58) Field of Classification Search
CPC . H01R 12/725; H01R 12/731; H01R 13/6583
(Continued)

(56) References Cited

U.S. PATENT DOCUMENTS 5,433,618 A * 7/1995 Morlion ............... H01R 12/724 439/607.06
6,435,914 B1 * 8/2002 Billman ............. H01R 13/6587 439/607.07
(Continued)

FOREIGN PATENT DOCUMENTS

CN 106025719 A 10/2016
CN 209313054 U 8/2019

OTHER PUBLICATIONS

[No Author Listed], SFF-TA-1007 Specification for Enterprise and Datacenter 1U Long SSD Form Factor. Development. Rev 0.0.1. Dec. 19, 2017. 13 pages.
(Continued)

*Primary Examiner* — Harshad C Patel
(74) *Attorney, Agent, or Firm* — Wolf, Greenfield & Sacks, P.C.

(57) ABSTRACT

A card edge connector for providing high-quality, high-speed interconnections between different printed circuit boards. The card edge connector includes a front housing holding a subassembly and providing a mating interface for the connector. The subassembly includes conductors held by a subassembly housing, and a subassembly shield on a side of the subassembly housing. A mating interface shield is coupled to the subassembly shield and extends beyond the subassembly shield into a wall of the front housing. The subassembly shield and mating interface shield may be coupled through compliant members such as spring fingers. The subassembly shield and mating interface shield may be in parallel planes with the mating interface shield offset away from the conductors though still electrically connected through the compliant members.

20 Claims, 13 Drawing Sheets

(58) Field of Classification Search
USPC .......................................................... 439/629
See application file for complete search history.

(56) References Cited

U.S. PATENT DOCUMENTS 7,993,147 B2 8/2011 Cole et al.
8,083,553 B2 * 12/2011 Manter ................ H01R 13/518 439/607.05
8,475,209 B1 * 7/2013 Whiteman, Jr. ... H01R 13/6586 439/607.07
9,257,778 B2 2/2016 Buck et al.
9,312,965 B2 4/2016 Iemura et al.
9,490,587 B1 * 11/2016 Phillips .............. H01R 13/6587
9,531,130 B1 12/2016 Phillips et al.
9,537,239 B1 * 1/2017 Liu .................... H01R 13/6587
9,666,998 B1 * 5/2017 de Boer ............. H01R 13/6596
9,748,681 B1 8/2017 Champion et al.
9,825,391 B2 11/2017 Cohen et al.
9,923,309 B1 * 3/2018 Aizawa .................. H05K 1/113
10,276,985 B1 * 4/2019 Liu .................... H01R 13/6587
10,553,968 B2 2/2020 Consoli et al.
11,522,321 B2 * 12/2022 Song ...................... H01R 13/40
11,600,953 B2 * 3/2023 Song .................. H01R 13/6582
11,646,535 B2 * 5/2023 Lin .................... H01R 13/6597 439/607.02
12,300,936 B2 * 5/2025 Paniagua ............... H01R 13/40
2010/0217909 A1 8/2010 Pavol et al.
2012/0214344 A1 8/2012 Cohen et al.
2014/0268536 A1 9/2014 Herman et al.
2014/0335735 A1 11/2014 Cohen et al.
2016/0285204 A1 * 9/2016 Morgan ............. H01R 13/6471
2018/0248289 A1 * 8/2018 Cohen ................ H01R 13/6461
2019/0104632 A1 4/2019 Nelson et al.
2019/0334292 A1 * 10/2019 Cartier, Jr. ........... H01R 13/518
2020/0212636 A1 * 7/2020 Chang ................ H01R 13/6474
2020/0266585 A1 8/2020 Paniagua et al.
2021/0399462 A1 * 12/2021 Song .................. H01R 13/6585
2021/0399494 A1 * 12/2021 Liu ........................ H01R 13/20
2022/0173537 A1 * 6/2022 Fan .................... H01R 13/6461
2022/0216652 A1 7/2022 Chen et al.

OTHER PUBLICATIONS

Fan et al., Compact High-Speed Electrical Connector, U.S. Appl. No. 18/494,129, filed Oct. 25, 2023.

* cited by examiner

HIGH-QUALITY, HIGH-SPEED CARD EDGE CONNECTOR

RELATED APPLICATIONS

This application claims priority to and the benefit of Chinese Patent Application Serial No. 202222680275.7, filed on Oct. 12, 2022. This application also claims priority to and the benefit of Chinese Patent Application Serial No. 202211245277.1, filed on Oct. 12, 2022. The contents of these applications are incorporated herein by reference in their entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as several printed circuit boards (PCB) which may be joined together with electrical connectors than to manufacture the system as a single assembly. A common example of this is memory cards that plug into electrical connectors on a personal computer's motherboard.

In servers and other powerful computers, multiple memory cards may be connected to the same motherboard. The memory cards may contain solid state memory and may serve as solid state drives. In some systems, for example, the memory cards may be orthogonal to the motherboard, and aligned in parallel along an edge of the motherboard. Such a configuration is described in an industry standard SFF-TA-1007.

Card edge connectors are configured to support this configuration, as they may be mounted to a PCB and mated with an add-in card, such as a memory card. A card edge connector may have a mating interface with a slot sized to receive an edge of the add-in card. Conductors, each with a mating contact at one end and a tail at the other end, may pass through a connector from the slot to a mounting interface. At the mounting interface the tails may be attached to the PCB. At the mating interface, the mating contacts may be exposed in the slot, where they can make electrical contacts to pads on an edge of the add-in card inserted into the slot.

BRIEF SUMMARY

Aspects of the present application relate to high-quality, high-speed card edge connectors.

Some embodiments relate to an electrical connector, including: a housing including a first slot at a mating face; and a subassembly partially disposed in the housing, the subassembly including a subassembly housing, a plurality of conductors held by the subassembly housing, and a first conductive member separate from the first slot of the housing, wherein: each of the plurality of conductors includes a mating end extending beyond the subassembly housing toward the mating face; and the first conductive member has a first portion extending beyond the subassembly housing toward the mating face and a second portion separated from the plurality of conductors by the subassembly housing.

Optionally, a second conductive member disposed on the subassembly housing, wherein the second portion of the first conductive member is separated from the subassembly housing by the subassembly housing and the second conductive member and the first portion of the first conductive member extends beyond the second conductive member toward the mating face.

Optionally, the first conductive member is coupled to the second conductive member.

Optionally, the first conductive member includes a body and a plurality of beams; and each of the plurality of beams includes a proximal end connected to the body and a portion extending toward the second conductive member such that the first conductive member is offset from the second conductive member in a transverse direction.

Optionally, the plurality of beams abut the second conductive member and electrically connect the first conductive member and the second conductive member.

Optionally, each of the plurality of beams includes a distal end disposed closer to the mating face than the proximal end.

Optionally, the first conductive member includes a plurality of projections extending toward the mating face.

Optionally, the housing includes a second slot extending from the first slot and holding a portion of the subassembly housing, a plurality of channels disposed on opposite sides of the first slot and at least partially holding the mating ends of the plurality of conductors, and a third slot separate from the first slot by the plurality of channels and is configured to receive the first portion of the first conductive member.

Optionally, a third conductive member disposed on the subassembly housing and extending into the first slot.

Optionally, a lossy member coupling the third conductive member to the second conductive member.

Some embodiments relate to a connector subassembly, including: a subassembly housing; a plurality of conductors held by the subassembly housing, each of the plurality of conductors including a mating end extending out of the subassembly housing; a first conductive member; and a second conductive member disposed between the subassembly housing and the first conductive member and coupled to the first conductive member, wherein the first conductive member extends beyond the second conductive member toward the mating ends of the plurality of conductors.

Optionally, the plurality of conductors include a plurality of pairs of differential signal conductors and a plurality of ground conductors disposed between adjacent pairs of differential signal conductors; and the connector subassembly includes a lossy member coupling the second conductive member to the plurality of ground conductors.

Optionally, the connector subassembly may include a third conductive member disposed on the subassembly housing and separate from the second conductive member by the subassembly housing, wherein: each of the plurality of ground conductors includes a plurality of openings; and the lossy member extends through the plurality of openings of each of the plurality of ground conductors to couple the third conductive member to the second conductive member.

Optionally, the first conductive member includes a planar portion parallel to the second conductive member and offset from the second conductive member in a transverse direction. Optionally, the plurality of conductors includes a single ended conductor.

Optionally, each of the plurality of conductors includes a mounting tail opposite the mating end; and the mounting tails of the plurality of pairs of differential signal conductors are shorter than the mounting tails of the plurality of ground conductors.

Some embodiments to an electrical connector, including: a housing including a slot; a pair of subassemblies partially disposed in the housing, each subassembly of the pair of subassemblies including a plurality of conductors each including a mating end curving into the slot; and a pair of first conductive members disposed in the housing and separated from each other by the pair of subassemblies.

Optionally, each subassembly of the pair of subassemblies includes: a subassembly housing, second and third conductive members disposed on opposite sides of the subassembly housing, and a lossy member disposed on the third conductive member and including portions extending through the third conductive member to the second conductive member; and the pair of subassemblies are disposed with the lossy members facing each other.

Optionally, each first conductive member of the pair of first conductive members includes a planar portion parallel to the second conductive member and offset from the second conductive member in a transverse direction, and a plurality of beams extending from the planar portion toward the second conductive member of a respective one of the pair of subassemblies.

Optionally, the electrical connector may include a shell disposed outside the housing and extending beyond the housing in a direction away from the slot of the housing.

Some embodiments relate to a card edge connector. The card edge connector may comprise an insulating housing having a mating face and a subassembly. The mating face may be provided with a first slot configured for receiving an edge of an add-in card. A front portion of the subassembly may be fixedly disposed in the insulating housing. The subassembly may include a plurality of conductors and a first conductive member. Each of the plurality of conductors may include a mating end on a front portion thereof. The mating end may be bent from a side of the first slot into the first slot. The first conductive member may be disposed at one side of the mating ends in the insulating housing. The first conductive member may be electrically coupled to a grounding member of the card edge connector.

Optionally, the first conductive member may comprise a planar portion disposed at an outer side of the mating ends of the plurality of conductors.

Optionally, the subassembly may further comprise a subassembly housing wrapped around middle portions of the plurality of conductors and a second conductive member covering on an outer side of the subassembly housing. The second conductive member may be electrically coupled to ground conductors of the plurality of conductors.

Optionally, the planar portion may be offset toward an outer side of the plurality of conductors relative to the second conductive member.

Optionally, a plurality of beams bent toward the second conductive member may be provided at a middle portion of the planar portion, and the plurality of beams may have bent portions abutting against and electrically contacting the second conductive member.

Optionally, each of the plurality of beams may be a cantilever beam having a distal end, which is closer to the mating face relative to the bent portion of the corresponding beam.

Optionally, a front edge of the planar portion facing the mating face may be provided with a plurality of first projections, and the plurality of first projections may extend forward to the mating ends.

Optionally, the insulating housing may be provided with a plurality of grooves with openings back to the mating face, and the plurality of first projections may be one-to-one correspondingly inserted into the plurality of grooves.

Optionally, the subassembly may further comprise a third conductive member disposed at an inner side of the plurality of conductors. The third conductive member may be electrically coupled to ground conductors in the plurality of conductors. A front portion of the third conductive member facing the mating face may extend into the first slot.

Optionally, the subassembly may further comprise a second conductive member disposed at an outer side of middle portions of the plurality of conductors. The second conductive member may be electrically coupled to the ground conductors in the plurality of conductors. The front portion of the third conductive member may protrude along a direction toward the mating face beyond a front portion of the second conductive member.

Optionally, the subassembly may further comprise a lossy member. The lossy member may be electrically coupled between the ground conductors and the third conductive member, and between the ground conductors and the second conductive member.

Optionally, the ground conductors may be provided with openings. The lossy member may penetrate the openings. A shielding frame may be formed by a portion of the lossy member penetrating the openings of any adjacent two ground conductors together with the third conductive member and the second conductive member. A differential signal conductor pair may pass through the shielding frame.

Optionally, there are a plurality of the shielding frames, which are disposed spaced apart along a length direction of the differential signal conductor pair.

Optionally, there may be at least one pair of the subassemblies with each pair of subassemblies opposite to each other about the first slot. The lossy member may form an engaging portion at an inner side of the third conductive member. The engaging portions of each pair of subassemblies may be connected to each other.

Optionally, a plurality of second projections may be disposed at the front portion of the third conductive member. The plurality of second projections may be disposed in one-to-one correspondence with the ground conductors and a plurality of differential signal conductors separated by the ground conductors in the plurality of conductors.

Optionally, the plurality of conductors may include ground conductors, a plurality of differential signal conductors separated by the ground conductors, and a single ended conductor disposed peripheral to the ground conductors and the differential signal conductors. The first conductive member may be disposed at one side of the differential signal conductors and the ground conductors.

Optionally, the plurality of conductors may include ground conductors and a plurality of differential signal conductors separated by the ground conductors. Each of the ground conductors may have a mounting tail opposite a mating end thereof. Each of the plurality of differential signal conductors may have a mounting tail opposite a mating end thereof. The mounting tail may be smaller and shorter than the mounting tail.

Some embodiments relate to a card edge connector. The card edge connector may an insulating housing having a mating face and a subassembly fixedly disposed in the insulating housing. The mating face may be provided with a first slot configured for receiving an edge of an add-in card. The subassembly may include a plurality of conductors. Mating ends of the plurality of conductors may be disposed on a side of the first slot. The plurality of conductors may include ground conductors and a plurality of pairs of differential signal conductors separated by the ground conductors. Each pair of differential signal conductors, along a length direction thereof, may pass through a shielding frame electrically coupled to the ground conductors, such that the shielding frame fully shields at least a portion of a corresponding pair of differential signal conductors along the length direction.

Optionally, the subassembly may further include a third conductive member disposed at an inner side of the plurality of conductors and a second conductive member disposed at an outer side of the plurality of conductors. Both the third conductive member and the second conductive member may be electrically coupled to the ground conductors in the plurality of conductors.

Optionally, the subassembly may further include a lossy member. The lossy member may be electrically coupled between the ground conductors and the third conductive member, and between the ground conductors and the second conductive member, to form a portion of the shielding frame.

Optionally, the ground conductors may be provided with openings. The lossy member may penetrate the openings. The shielding frame may be formed by a portion of the lossy member penetrating the openings of any adjacent two ground conductors together with the third conductive member and the second conductive member.

Optionally, there may be at least one pair of the subassemblies with each pair of subassemblies opposite to each other about the first slot. The lossy member may form an engaging portion at an inner side of the third conductive member. The engaging portions of each pair of subassemblies may be connected to each other.

Optionally, a plurality of second projections may be disposed at a front portion of the third conductive member. The plurality of second projections may be disposed in one-to-one correspondence with the ground conductors and the differential signal conductors separated by the ground conductors in the plurality of conductors.

Optionally, a front portion of the third conductive member facing the mating face may extend into the first slot.

Optionally, a front portion of the third conductive member may protrude beyond a front portion of the second conductive member along a direction toward the mating face.

Optionally, the card edge connector may further comprise a planar portion. Each of the plurality of conductors may include a mating end disposed on a front portion thereof. The mating end may be bent from a side of the first slot into the first slot. The planar portion may be disposed at an outer side of the mating ends of the plurality of conductors in the insulating housing. The planar portion may be in electrical contact with the second conductive member.

Optionally, the planar portion may be offset toward the outer side of the plurality conductors relative to the second conductive member.

Optionally, a plurality of beams bent toward the second conductive member may be provided at a middle portion of the planar portion. The plurality of beams may have bent portions abutting against and electrically contacting the second conductive member.

Optionally, each of the plurality of beams may be a cantilever beam having a distal end, which is closer to the mating face relative to the bent portion of the corresponding beam.

Optionally, a front edge of the planar portion facing the mating face may be provided with a plurality of first projections. The plurality of first projections may extend forward to the mating ends.

Optionally, the insulating housing may be provided with a plurality of grooves having openings back to the mating face. The plurality of first projections may be one-to-one correspondingly inserted into the plurality of grooves.

Optionally, the plurality of conductors may further include a single ended conductor disposed peripheral to the ground conductors and the plurality of pairs of the differential signal conductors.

Optionally, each of the ground conductors may have a mounting tail opposite a mating end thereof. Each of the plurality of pairs of differential signal conductors may have a mounting tail opposite a mating end thereof. The mounting tail may be smaller and shorter than the mounting tail.

Optionally, there may be a plurality of the shielding frames, which are disposed spaced apart along the length direction of the plurality of pairs of differential signal conductors.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1A:
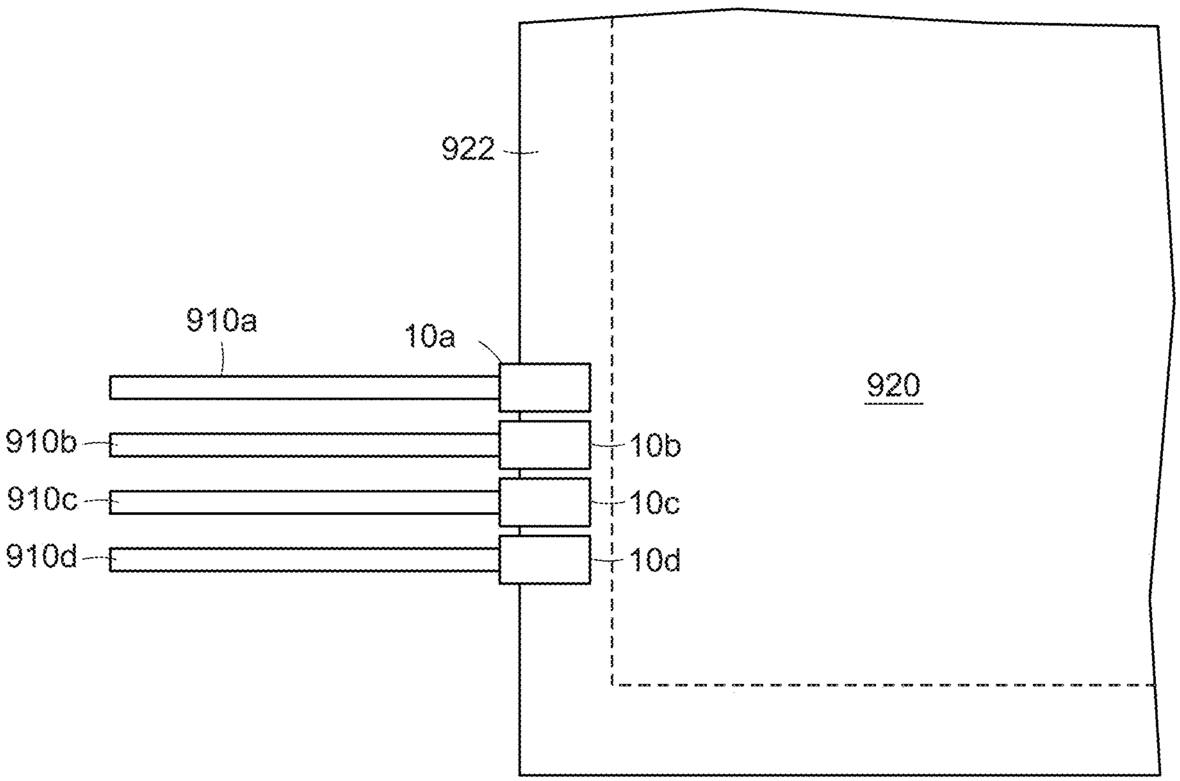
FIG. 1A is a top plan view of an exemplary application of card edge connectors, in which the card edge connectors according to some embodiments, are mounted in a peripheral region of a PCB for connection of a plurality of add-in cards to the PCB.

The above accompanying drawings include the following reference signs:

10, card edge connector; 100, insulating housing; 101, mating face; 110, first slot; 120, groove; 130, channel; 140, third slot; 150, second slot; 160, second securing portion; 200, subassembly; 300, conductor; 301, mating end; 302, mounting tail; 310, ground conductor; 311, mating end; 312, mounting tail; 313, first opening; 320, differential signal conductor; 321, mating end;

322, mounting tail; 330, single ended conductor; 330*a*, third conductor; 331*a*, mating end; 332*a*, mounting tail; 330*b*, fourth conductor; 331*b*, contact portion; 332*b*, mounting tail; 400, interface shield; 410, planar portion; 411, beam; 411*a*, bent portion; 411*b*, distal end; 411*c*, proximal end; 412, first projection; 413, opening; 414, body; 415, front edge; 510, outer shield; 511, front portion of second conductive member; 512, second opening; 520, inner shield; 521, front portion of third conductive member; 522, second projection; 523, third opening; 600, subassembly housing; 611, first securing portion; 612, third securing portion 700, lossy member; 710, protrusion; 730, engaging portion; 800, shell; 811, first retainer; 812, second retainer; 830, clip; 910, add-in card; 920, motherboard; 922, peripheral region.

DETAILED DESCRIPTION

The inventors have recognized and appreciated designs for a connector that supports high signal transmission speed, with high signal transmission quality and low crosstalk. Electronic systems in general have changed to be smaller, faster, and more functionally complicated. As a result of such changes, the number of circuits within a given area of an electronic system and the frequency at which the circuits operate have increased significantly in recent years. Current card edge connectors transmit more data between the circuits and add-in cards, and the data is required to be transmitted at a faster rate than that of the card edge connectors of a few years ago. Internet servers and routers are examples of data-handling systems that may support multiple high data-rate channels. Data transmission rates for each channel in such systems can be up to and well over 10 Gigabit/sec (Gb/s). In some implementations, data rates may be as high as 150 Gb/s, for example. In some embodiments, connectors as described herein may be capable of carrying data for multiple such high-speed data channels.

The inventors have recognized and appreciated connector design techniques that enable these high signal transmission speeds, with high signal transmission quality and/or low crosstalk. One or more of these techniques may provide shielding at the mating interface of a card edge connector, despite challenges that have conventionally deterred incorporating shielding in this location. For example, the mating contacts of conductors flex outwardly when mated with a mating component such as a card and shielding may interfere with this movement. In some embodiments, a card edge connector may include a first conductive member that is disposed in the connector's mating interface and provides reliable shielding at the mating interface. The first conductive member may be integrated into the connector such that it may be electrically connected to other conductive members that provide shielding in other portions of the connector yet insulated from the mating ends of a plurality of conductors carrying signals through the connector. Further, according to the techniques described herein, such a connector may be easily and reliably assembled.

In some examples, the connector may include a front housing holding a subassembly. The front housing may have a slot at a mating face configured to receive a mating component. The subassembly may include conductors held by a subassembly housing with mating ends extending from the subassembly housing and into the front housing where they are exposed at the mating interface. A second conductive member, serving as a subassembly shield, may be disposed on a side of the subassembly housing.

The first conductive member may have a first portion that extends into the mating interface area of the connector and a second potion that overlaps the second conductive member such that they may be electrically connected. The electrical connection between the first conductive ember and the second conductive member may be through compliant members on either or both of the conductive members. With such an arrangement, body potions of the first conductive member and the second conductive member may be separated, such as because they are in different, but parallel, planes.

Such a configuration may result, for example, from the first potion of the first conductive member being separated from the mating potions of the conductors of the subassembly. In some examples, the first potion of the first conductive member may extend into a wall of the front housing bounding a slot while the subassembly is inserted into that slot. In this case, the first potion of the first conductive member may be separated from the mating potions of the conductors by that wall of the front housing, which also creates separation with respect to the second conductive member, which is on the subassembly inserted into the slot. Compliant members, such as beams, may have a sufficient working range to span the separation between first conductive member and the second conductive member. As a result, an electrical connection between the first conductive member and the second conductive member may be simply and reliably formed as the subassembly is inserted into the front housing.

In some examples, a subassembly may have a shield on either or both sides. The conductive member disposed on the inner side of the subassembly housing may extend beyond the subassembly housing into the slot of the housing, while the conductive member disposed on the outer side of the subassembly housing may not extend beyond the subassembly housing. Such a configuration reduces the risk of accidentally shorting the conductors to the conductive members since the mating ends of the conductors may be pushed outwards by a mating component. The first conductive member may be coupled to and extend beyond the conductive member disposed on the outer side of the subassembly housing. Such a configuration enables shielding at the mating interface by the first conductive member with reduced risk of accidentally shorting the conductors to the first conductive member, since the first conductive member may be offset from the conductive member disposed on the outer side of the subassembly housing in an outward direction.

In some embodiments, the first conductive member may include a body and multiple beams extending from the body toward the conductive member disposed on the outer side of the subassembly housing. Each beam may include a proximal end connected to the body, and a distal end opposite the proximal end. The distal end may be closer to the mating face than the proximal end. The beams may be configured to provide suitable contact forces to the conductive member disposed on the outer side of the subassembly housing and sufficient offset between the first conductive member and the conductive member disposed on the outer side of the subassembly housing to reduce the risk of accidentally shorting the conductors to the first conductive member.

In some examples, an interface shield may be attached on either or both sides of a slot. In some examples, a connector may be a card edge connector that has mating ends of conductors on two sides of the slot. The mating ends on each side of the slot may be a portion of a separate subassembly, with two subassemblies inserted as a pair into a front housing. In such a configuration, a mating interface shield may be provided for each subassembly of the pair, with the mating interface shields on opposing, outer sides of the pair of subassemblies. In this configuration, each of the mating interface shields may extend into a wall of the front housing bounding a slot forming the mating interface.

In some embodiments, the card edge connector may be configured such that shielding is provided around pairs of differential signal conductors substantially along their lengths. The card edge connector may include ground conductors disposed between the pairs of different signal conductors, and a lossy member extending between the conductive members disposed on the inner and outer sides of the subassembly housing through openings of the ground conductors.

An example system where such card edge connectors may be used is depicted in FIG. 1A. The illustrated system shows five PCB's and may be part of a server, for example. One of the PCBs may be a motherboard 920 (a portion of which is shown), which may include circuitry and patterned conductors on one or more levels of the PCB. The system may also include one or more card edge connectors 10*a* . . . 10*d* that receive add-in cards 910*a* . . . 910*d*. The card edge connectors 10*a* . . . 10*d* may be located in a peripheral region 922 of the motherboard 920 and provide a plurality of interconnect paths between the motherboard 920 and the add-in cards 910*a* . . . 910*d*. For the configuration shown in FIG. 1A, the card edge connectors may be referred to as "orthogonal" connectors since the connected add-in cards 910*a* . . . 910*d* have their circuit planes or broad surfaces oriented orthogonal to the circuit plane(s) of the motherboard 920. According to some implementations, the motherboard 920 and add-in cards 910*a* . . . 910*d* may be assembled in a support frame or enclosure to fit into one standard unit (1U) of an information technology (IT) equipment rack (approximately 1.75 inches high for a 19-inch-wide or 23-in-wide equipment rack). The add-in cards may contain non-volatile memory chips and may be used in the system as solid-state drives (SSDs).

In some implementations, such multi-row connectors 10*a* . . . 10*d* may conform to industry standards or specifications in some cases, such as the small form factor (SFF) specifications. As just one example, a card edge connector may receive cards that conform to the SFF-TA-1007 specification. The specification may specify a number, arrangement, and spacing of contact pads on an add-in card that electrically connect to contacts on the multi-row connector. In some embodiments, the center-to-center spacing between contact pads on the add-in cards 910*a* . . . 910*d* can be essentially or exactly 0.6 millimeters (mm), though other spacings may be used in other embodiments.

Figure 1B:
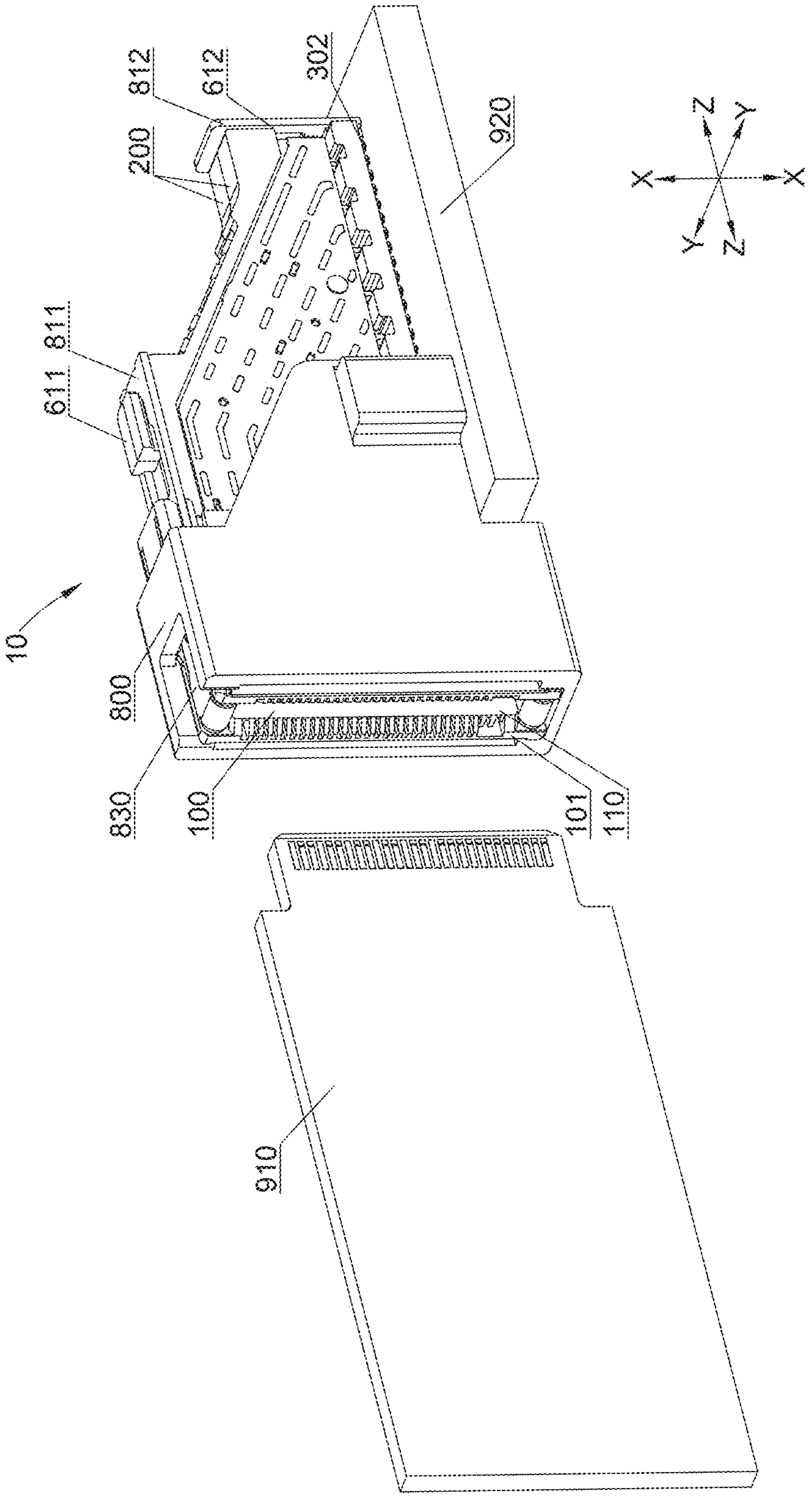
FIG. 1B is a perspective view of a card edge connector according to an exemplary embodiment of the present disclosure applied in an electronic system, with an add-in card configured to mate with the card edge connector.

FIG. 1B shows one of the groups of add-in cards and card edge connectors, and a portion of a motherboard 920 as shown in FIG. 1A. The add-in card is configured to be mounted onto the card edge connector. The add-in card 910 may be any one of the add-in cards 910*a* . . . 910*d*, and the card edge connector 10 may be one of the card edge connectors 10*a* . . . 10*d* corresponding to the preceding add-in card. Although one group comprising the add-in card and the card edge connector may have a different structure and function from the other groups, with respect to the improvements provided by the present disclosure, the card edge connectors in different groups may be similar. For the add-in cards in different types or versions, they may have different numbers of contact pads. The contact pads are electrically connected to mating ends in the card edge connector 10 when the add-in card 910 is inserted into the card edge connector 10.

Figure 2:
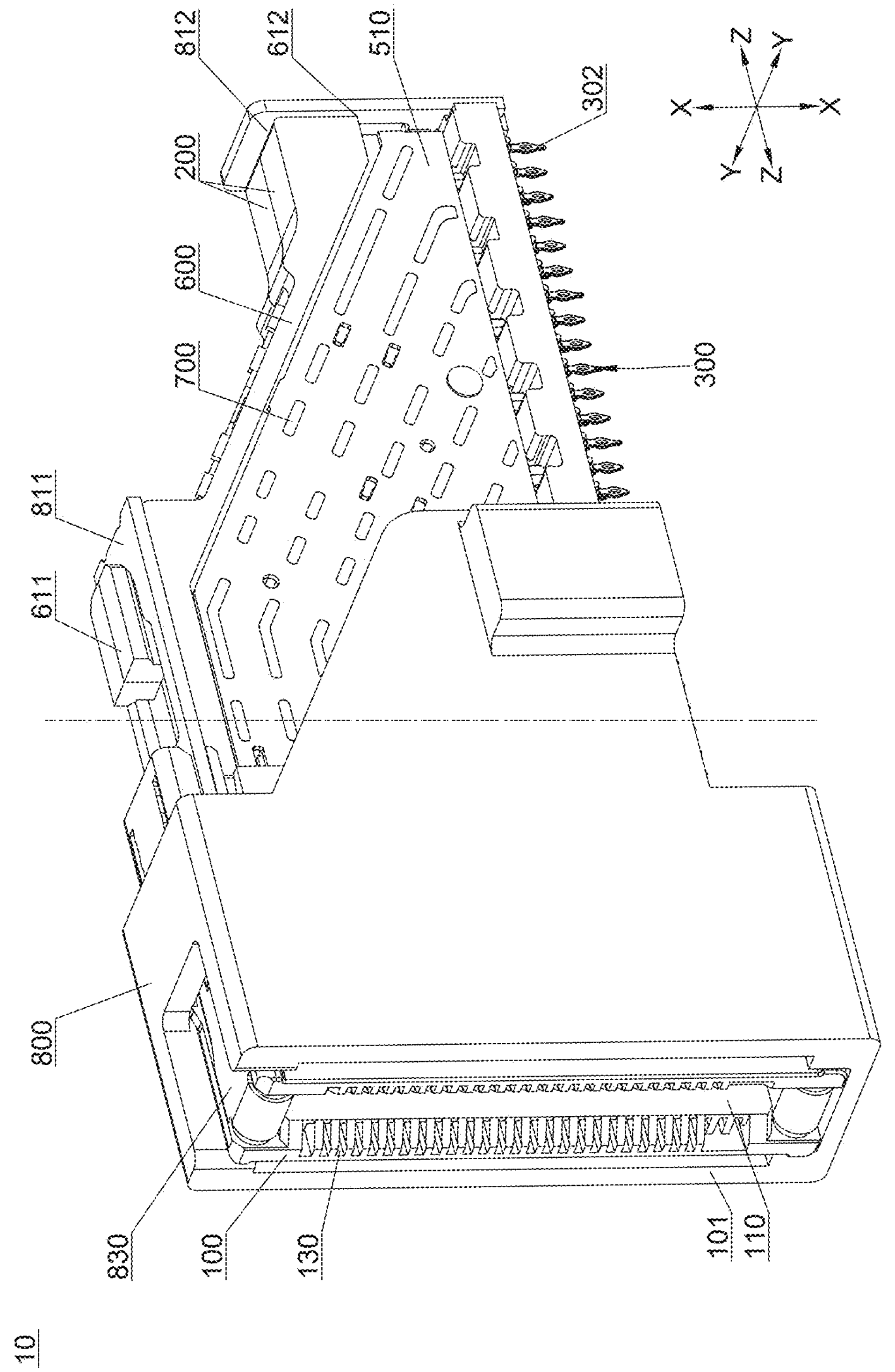
FIG. 2 is a perspective view of a card edge connector, according to an exemplary embodiment of the present disclosure.
Figure 3:
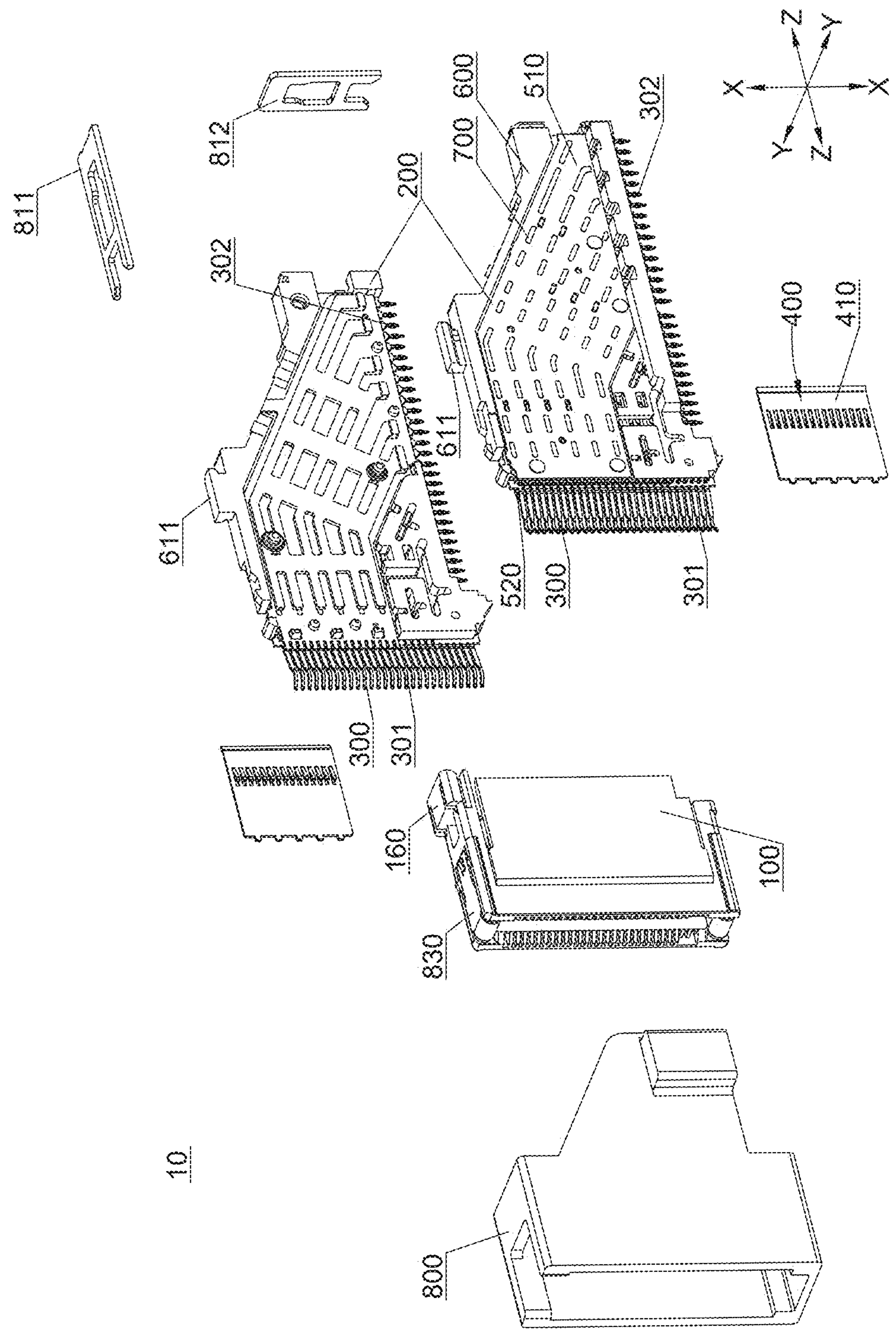
FIG. 3 is an exploded perspective view of the card edge connector of FIG. 2.

As shown in FIGS. 1B and 2-3, the card edge connector 10 may comprise an insulating housing 100 and subassemblies 200. The insulating housing 100 may be molded with an insulative material, such as a plastic. Various types of plastics may be used such as, but not limited to, liquid crystal polymers (LCP), polyphenylene sulfite (PPS), high-temperature nylon or poly-p-phenylene oxide (PPO), or polypropylene (PP). In some cases, the plastic may be a thermoset plastic. In some cases, the insulative plastic may include insulative reinforcing material such as glass fibers. The insulating housing 100 may generally be a one-piece member.

The insulating housing 100 may have a mating face 101. A vertical direction Z-Z, a longitudinal direction X-X and a transverse direction Y-Y may be defined with reference to the mating face 101. The longitudinal directions X-X and the transverse direction Y-Y may be perpendicular to each other in the mating face 101, and the vertical direction Z-Z may be perpendicular to the longitudinal directions X-X and the transverse direction Y-Y. The mating face 101 may be provided with a first slot 110 extending along a longitudinal direction X-X. The first slot 110 may be recessed inward along the vertical direction Z-Z for receiving the edge of the add-in card 900. The edge of the add-in card 900 may be inserted into the first slot 110.

The front portions of the subassemblies 200 may be fixedly disposed in the insulating housing 100, as shown in FIGS. 2-3. The subassemblies 200 each may include a plurality of conductors 300. The conductors 300 may be spaced apart from each other to ensure that adjacent conductors 300 are electrically insulated from each other. The conductors 300 may be made of an electrically conductive material, such as metal. The conductors 300 each may be an elongated one-piece member. The conductors 300 may extend into the first slot 110. For example, each of the conductors 300 may include a mating end 301 at its front end and a mounting tail 302 at its rear end, as shown in FIG. 3. The mating ends 301 may be accommodated in the insulating housing 100. In some embodiments, the mating ends 301 may be bent and protruded into the first slot 110. The mounting tails 302 may extend beyond the insulating housing 100.

The mating ends 301 of the conductors 300 may be arranged in two rows on two sides of the first slot 110 opposed to each other in the transverse direction Y-Y, with each row extending along the longitudinal direction X-X. Optionally, the two rows of mating ends 301 may be aligned with each other along the longitudinal direction X-X. Optionally, the two rows of mating ends 301 may be staggered along the longitudinal direction X-X to increase the space between the conductors 300 so as to reduce crosstalk. Optionally, the conductors 300 may be arranged on one side of the first slot 110.

Figure 10:
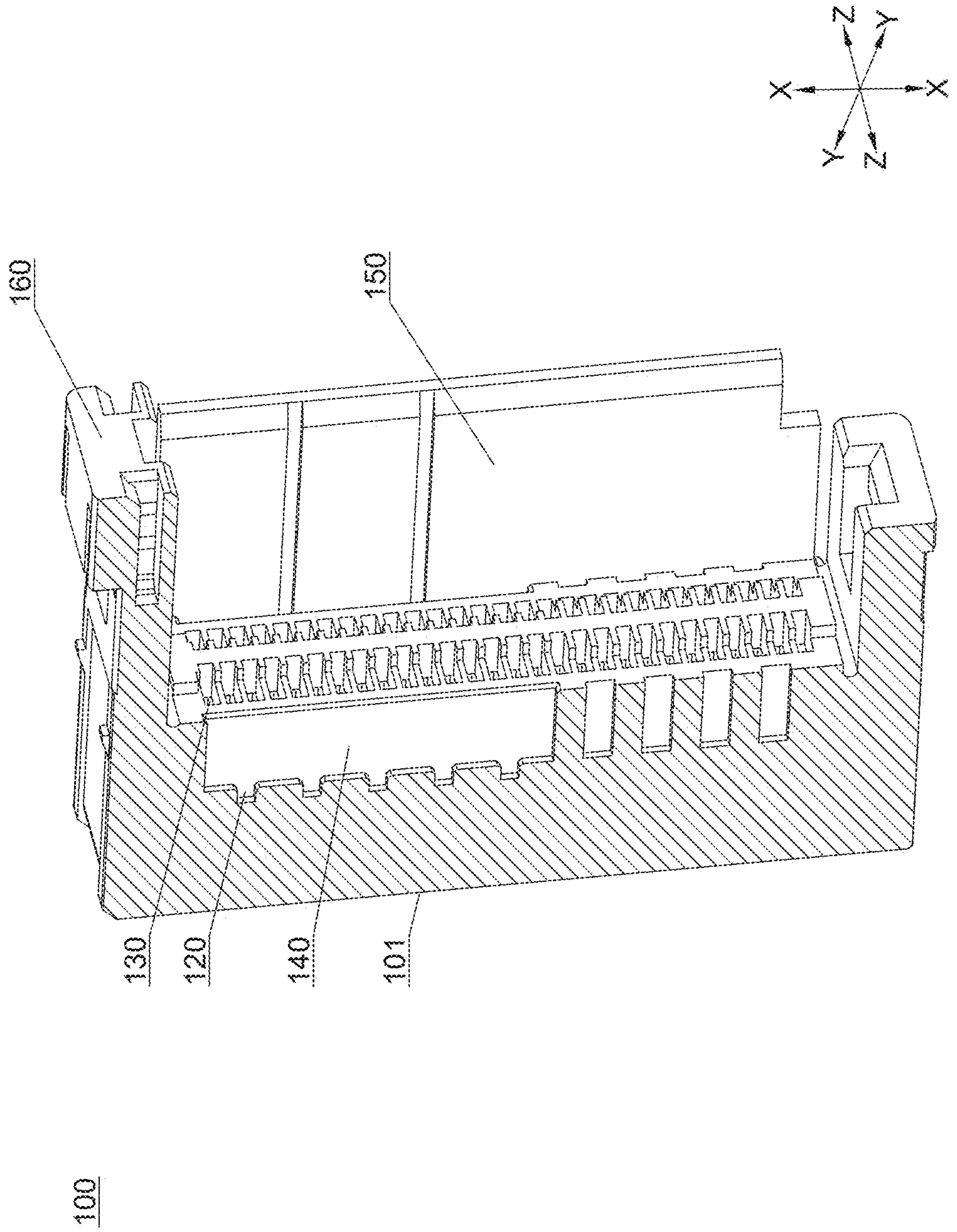
FIG. 10 is a cross-sectional perspective view of an insulating housing of FIG. 3.
Figure 11:
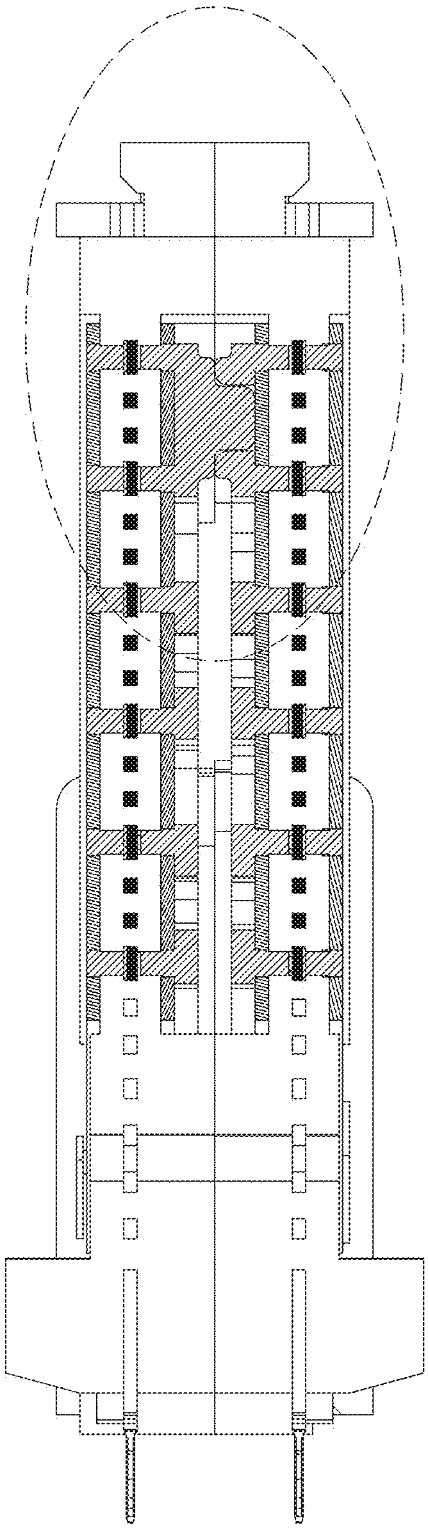
FIG. 11 is a cross-sectional view of the card edge connector of FIG. 2.

As shown in FIG. 10, a plurality of channels 130 may be provided in the insulating housing 100. The plurality of channels 130 may be disposed on both sides of the first slot 110. The mating ends 301 of the plurality of conductors 300 may be installed one-to-one to the plurality of channels 130. The mating ends 301 of the conductors 300 may be positioned by the channels 130 in respective expected positions, thereby ensuring stable performance of the card edge connector 10. For example, the mating ends 301 of the conductors 300 may be inserted into the channels 130 from the rear side of the insulating housing 100. Mating contact surfaces on the mating ends 301 of the conductors 300 may protrude beyond the channels 130 and curve into the first slot 110. The mating contact surfaces may abut against the contact pads on the add-in card 910 when the add-in card 910 is inserted into the first slot 110 and mate with these contact pads, thereby establishing an electrical connection.

For each conductive subassembly 200, the conductors 300 may be held by a subassembly housing 600 that may be over-molded thereon, while the mating ends 301 and mounting tails 302 are exposed by the subassembly housing 600. With continued reference to FIG. 10, the rear portion of the insulating housing 100 may further be provided with a second slot 150. The front portion of the subassembly housing 600 of the subassembly 200 may be inserted and retain inside the second slot 150. The card edge connector 10 may comprise two subassemblies 200. The two subassemblies 200 may get close to each other and the front portions of their subassembly housings 600 are inserted into the second slot 150. A first retainer 811 may be provided such that the front portions of the subassemblies 200 may be firmly secured to the insulating housing 100. Exemplarily, a first securing portion 611 may be provided on the subassembly housing 600 of each subassembly 200, as shown in FIG. 3. A second securing portion 160 may be provided on the insulating housing 100. The first retainer 811 may be connected to the first securing portions 611 and the second securing portion 160, so that the insulating housing 100 and the two subassemblies 200 are fixed together.

In other embodiments not shown, more subassemblies 200 may be provided, for example, two pairs of subassemblies 200. Two conductive assemblies in each pair are disposed on two sides of the first slot 110, respectively, and the mating ends 301 of the conductors 300 of the subassemblies 200 disposed on the same side may be arranged in a row to facilitate the mating with the contact pads on the corresponding side of the add-in card 910. The mating tails 302 of the conductors 300 of the subassemblies 200 disposed on the same side of the first slot 110 may be arranged in columns, and the number of the columns equal to that of the subassemblies 200 on that side. That is, on that side, the mounting tails 302 of each subassembly 200 are disposed in one column, and when there are two subassemblies 200 on that side, the mounting tails 302 of the two subassemblies 200 are arranged in two columns. This brings the advantage that the number of mounting tails 302 included in each column is smaller, thus these mounting tails 302 may occupy a narrower peripheral region 922 on the motherboard 920, allowing a larger central region on the motherboard 920 where more conductive traces can be arranged.

As shown in FIGS. 2-3, the mounting tail 302 of each conductor 300 may be connected to the motherboard 920. In some embodiments, the mounting tail 302 may be inserted into a conductive opening in the motherboard 920 and form an electrical connection with the corresponding conductive opening. In this embodiment, the mounting tail 302 may be shaped as a press-fit flexible segment. Several rows and columns of conductive openings may be disposed in the peripheral region 922 of the motherboard 920, and the arrangement pattern of these conductive openings may correspond to that of the mounting tails 302 of the card edge connector 10. The motherboard 920 may be configured as a circuit board as described below. The sidewall of each conductive opening may be plated with a metal conductive layer. The mounting tails 302 are inserted into the corresponding conductive openings and may be in electrical contact with the metal conductive layers. The metal conductive layers of these conductive openings may be electrically connected to different conductive traces in the circuit board to form the expected circuitry. In other embodiments not shown, the mounting tails of the conductors may be mounting tails based on the technologies, such as Surface Mounted Technology (SMT) and/or Opening Technology (THT). The mounting tails may be soldered to pads on the motherboard 920 by the technologies such as SMT and/or THT, thereby realizing an electrical connection with the circuits of the circuit board. Regardless of the manner for electrical connecting the mounting tails to the circuit board, the interconnection of the add-in cards to the circuits in the circuit board can be achieved through this card edge connector 10.

The card edge connector 10 may further comprise a shell 800. For example, the shell 800 may be metal, such as die cast aluminum or a machined member. The shell 800 may provide a cover for the insulating housing 100. The shell 800 may extend rearwardly and cover a portion of the subassemblies 200. The shell 800 may provide adequate mechanical support and protection for the insulating housing 100 and the subassembly 200. According to some embodiments, the dimension of the card edge connector 10 may be less than 40 mm, or approximately this value, along a longitudinal direction X-X. The dimension of the card edge connector 10 in the longitudinal direction X-X is substantially determined by the shell 800. According to some embodiments, this dimension may be between 30 mm and 42 mm, or between approximately these values, such that the connector may be used with assemblies that fit into one standard unit of an IT equipment rack. In alternative embodiments, the dimension may be greater than 42 mm.

Figure 6:
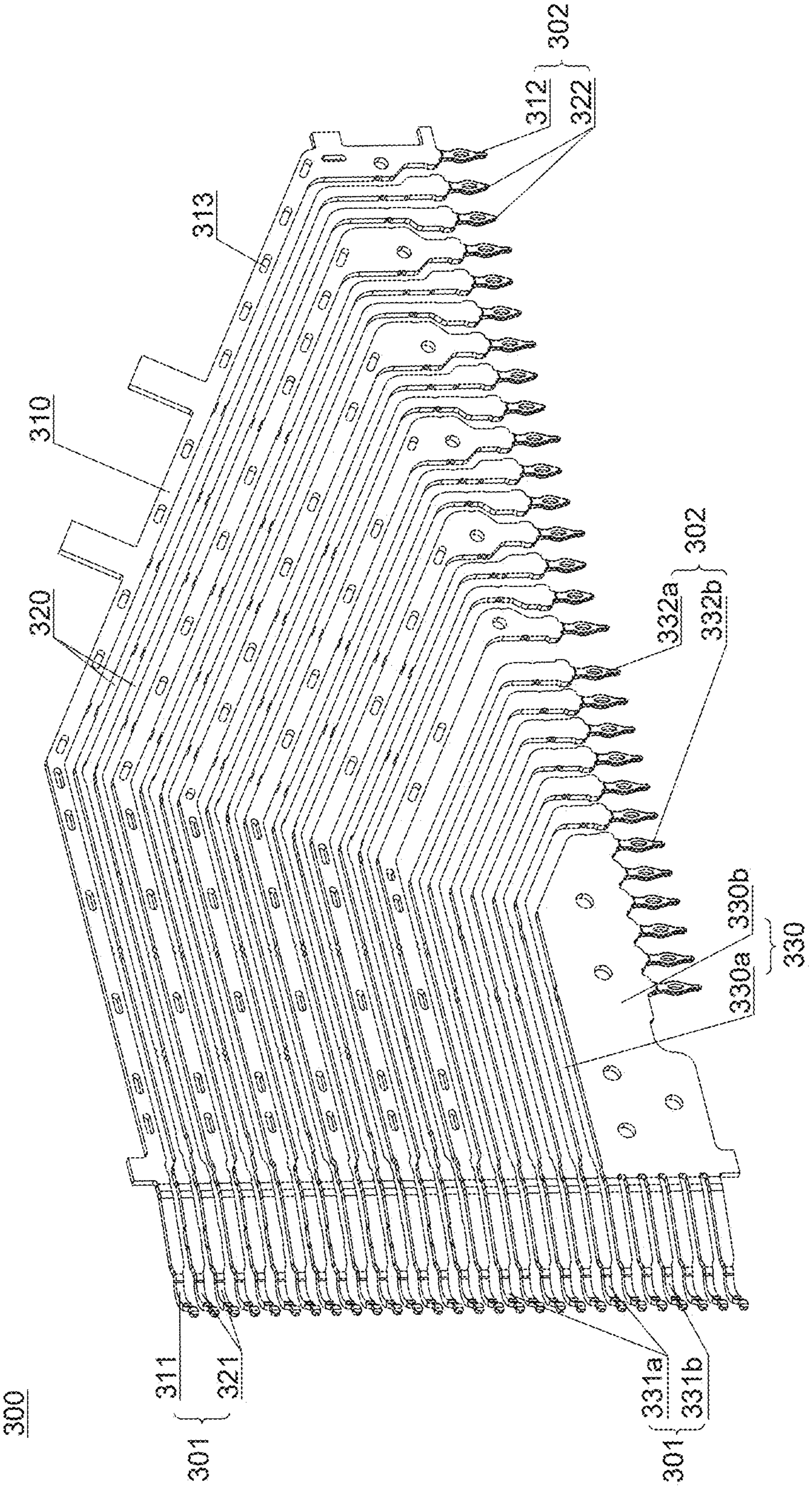
FIG. 6 is a perspective view of conductors of FIG. 3.

In some embodiments, as shown in FIG. 6, the conductors 300 may comprise a plurality of ground conductors 310 and a plurality of differential signal conductors 320. The plurality of ground conductors 310 may be dispersed among the plurality of differential signal conductors 320. The plurality of ground conductors 310 and the plurality of differential signal conductors 320 may be arranged in various desired patterns. The ground conductors 310 may space the differential signal conductors 320 apart. The differential signal conductors 320 appear in pairs to form differential signal conductor pairs. The differential signal conductor pairs may be configured to carry high data-rate signals (e.g., signals carrying data rates over 25 Gb/sec with PAM4 encoding) or high-frequency signals (e.g., over 56 or 112 Gb/sec), according to some implementations. The pairs of differential signal conductors 320 may be separated by ground conductors 310, for reducing crosstalk when the differential signal conductor pairs are used to transmit high-speed signals.

Additionally, as shown in FIG. 6, the conductors 300 may comprise a plurality of single ended conductors 330. The single ended conductors 330 may be on the periphery of the plurality of ground conductors 310 and the plurality of differential signal conductors 320. According to some embodiments, the single ended conductors 330 may comprise one or more third conductors 330*a*. A third conductor 330*a* may carry low-frequency signals (e.g., frequencies less than 500 MHz), lower data-rate signals (e.g., less than 100 Mb/s), logic control signals, a bias potential, or a reference potential. According to some embodiments, the single ended conductors 330 may comprise one or more fourth conductors 330*b*. A fourth conductor 330*b* may have more than one mounting tail and more than one mating ends. A fourth conductor 330*b* may carry DC power. Additionally or alternatively, a fourth conductor 330*b* may carry other high current and low frequency signal.

Back to FIG. 3 for reference, the card edge connector 10 may further comprise an interface shield 400. The interface shield 400 is disposed inside the insulating housing 100. The interface shield 400 may be disposed at a side of the mating ends 301 of the plurality of conductors 300. In the embodiments where single ended conductors 330 are included, the interface shield 400 may be disposed at a side of the plurality of ground conductors 310 and the plurality of differential signal conductors 320, rather than at a side of the single ended conductors 330.

As shown in FIG. 6, each ground conductor 310 may include a mating end 311 and a mounting tail 312, which are respectively disposed at two ends opposed to each other along its extension direction. Each differential signal conductor 320 may include, along its extension direction, a mating end 321 and a mounting tail 322 at two ends respectively. Each third conductor 330*a* may include, along its extension direction, a mating end 331*a* and a mounting tail 332*a* at two ends respectively. Each fourth conductor 330*b* may include, along its extension direction, a contact portion 331*b* and a mounting tail 332*b* at two ends respectively. In this case, the afore-mentioned mating ends 301 may include the mating ends 311, the mating ends 321, the mating ends 331*a* and the contact portions 331*b*. The mating ends 301 may extend into the first slot 110. The afore-mentioned mounting tails 302 may include the mounting tails 312, the mounting tails 322, the mounting tails 332*a*, and the mounting tails 332*b*. The mounting tails 302 may be mounted to the motherboard 920. Depending on the types of the conductors 300 included in the card edge connector 10, there may be fewer or more kinds of the mating ends 301 mentioned above and fewer or more the kinds of the mounting tails 302 mentioned above.

In some embodiments, the mounting tails 312, the mounting tails 322, the mounting tails 332*a* and the mounting tails 332*b* may be mounted to the motherboard 920 by THT. Preferably, the smaller and shorter the mounting tails 312, the mounting tails 322, the mounting tails 332*a* and the mounting tails 332*b* are, the more favorable they are for increasing the speed of signal transmission. Exemplarily, the widths of the mounting tails 312, the mounting tails 322, the mounting tails 332*a* and the mounting tails 332*b* may be about 0.42 mm. Exemplarily, the mounting tails 322 may be smaller and shorter than the mounting tails 312. With this configuration, the differential signal conductors 320 have reduced stub resonance, which allows it to be used for transmitting high-speed signals and improves signal integrity. In this way, the card edge connector 10 can operate at a higher frequency while meeting the dimensional requirements of relevant industry standards.

The interface shield 400 may be stamped, cut, or molded from, for example, metallic materials. The interface shield 400 may be inserted in the insulating housing 100, or held in the insulating housing 100 by any other suitable methods such as bonding or welding. The interface shield 400 may be disposed at one side of the mating ends 301 of the conductors 300. The interface shield 400 may be inserted into the first slot 110 or at least partially disposed in a sidewall of the first slot 110. The interface shield 400 may be electrically coupled to the grounding member of the card edge connector 10. Exemplarily, the grounding member of the card edge connector 10 may include the ground conductors 310, the shell 800 and any suitable structure capable of being grounded.

The interface shield 400 may be provided at the first slot 110 so as to allow for a shielding in the transmission path of the card edge connector 10. In this way, signal transmission speed can be increased while signal integrity is improved. As a result, the card edge connector 10 provided by the embodiments of the present disclosure can have great electrical performances, leading to faster and functionally more complicated electronic systems.

Figure 8:
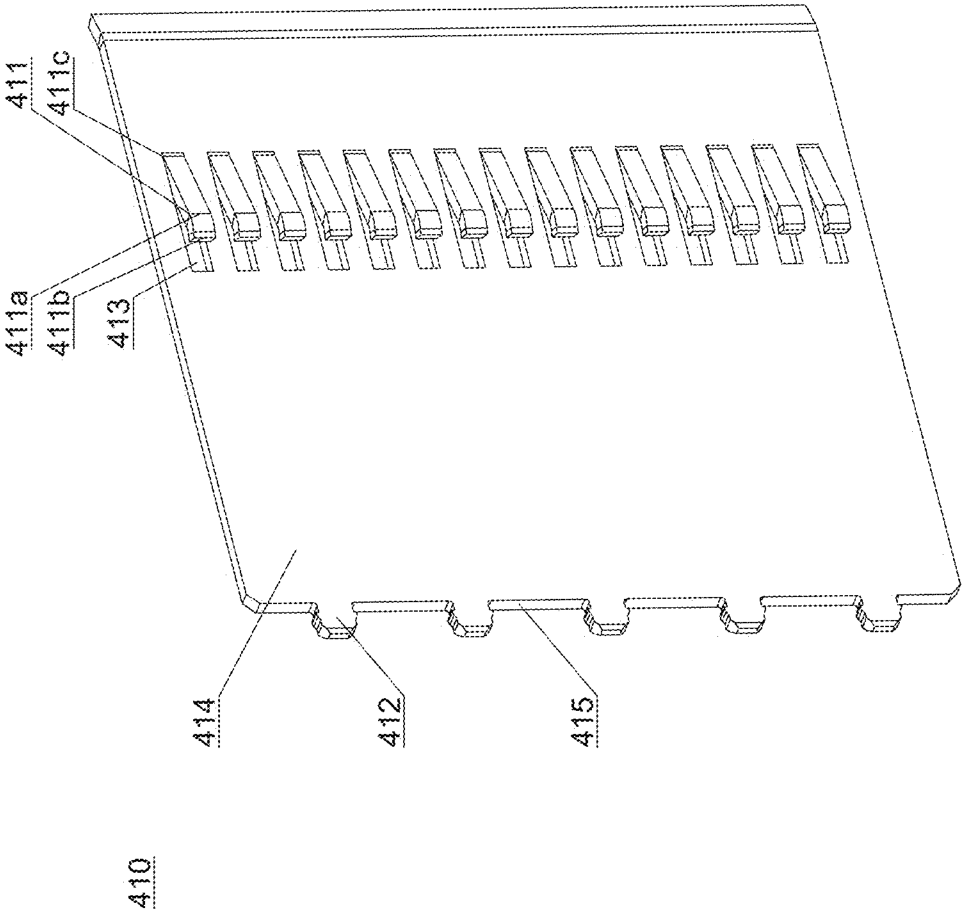
FIG. 8 is a perspective view of a planar portion of FIG. 3.
Figure 9:
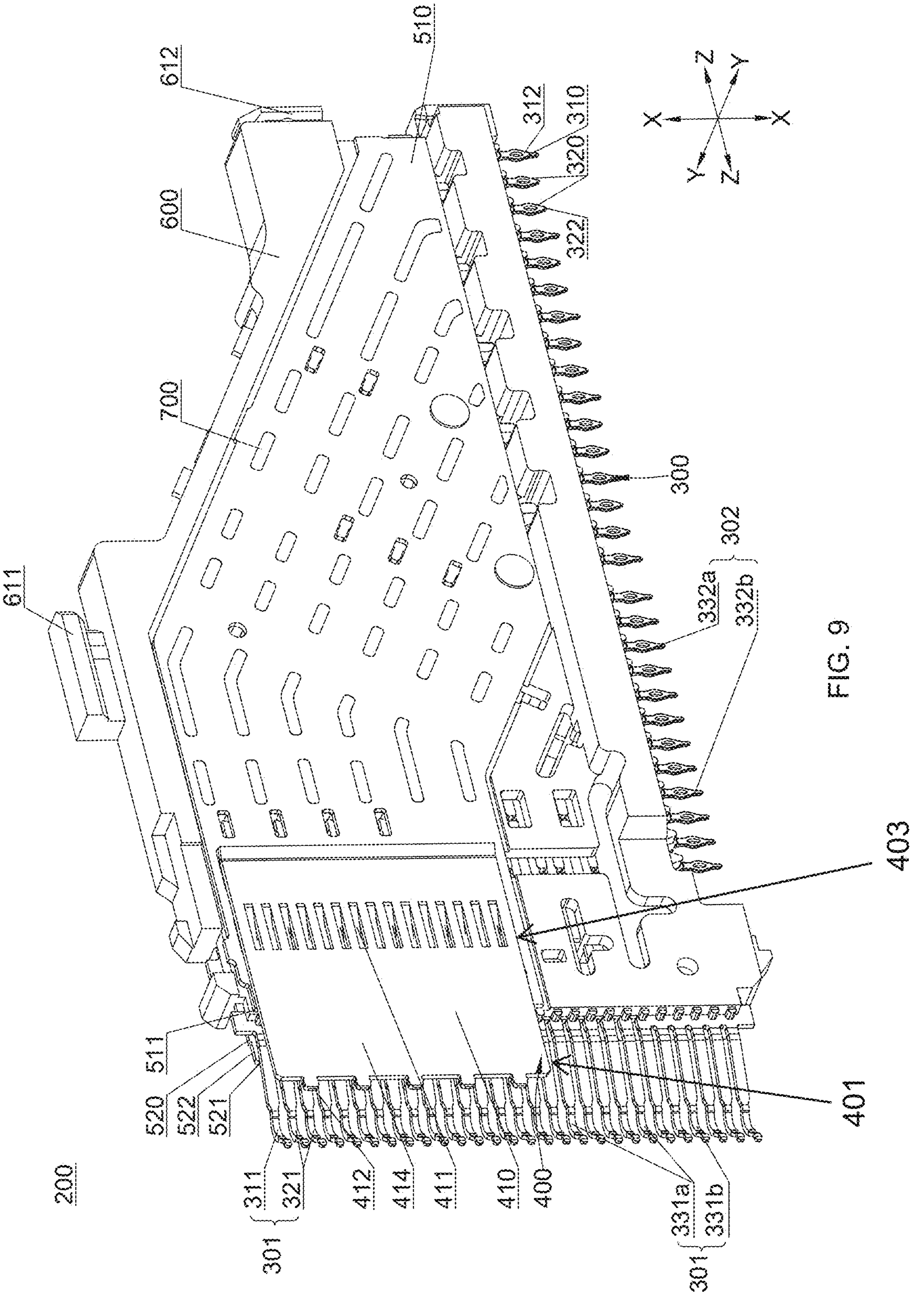
FIG. 9 is a perspective view of a subassembly of FIG. 3.

The interface shield 400 may have any suitable structure, including but not limited to a shielding strip or a shielding frame. In some embodiments, as shown in FIGS. 8-9, the interface shield 400 may comprise a planar portion 410, which may be disposed on an outer side of the mating ends 301 of the plurality of conductors 300. The orientation term "out" as used herein and hereinafter refers to the side away from the inside of the first slot 110, while the orientation term "in" refers to the side close to the inside of the first slot 110. The planar portion 410 may be disposed entirely in the sidewall of the first slot 110, or at least partially in the sidewall of the first slot 110. Exemplarily, as shown in FIG. 10, the insulating housing 100 may be provided with a third slot 140. The third slot 140 may be disposed at the outer side of the channels 130. The planar portion 410 may be plugged to the third slot 140. In the transverse direction Y-Y, the planar portion 410 may be disposed between the mating ends 301 of the plurality of conductors 300 and the insulating housing 100. The planar portion 410 may be made of a metallic material, and the mating ends 301 of the plurality of conductors 300 are spaced apart from the planar portion 410 to prevent short circuit between the conductors 300. The planar portion 410 may be disposed at the outer side of the mating ends 321 of the differential signal conductors 320, and adjacent differential signal pairs may also be separated by the ground conductors 310. The ground conductors 310 and the planar portion 410 may form the shielding for the differential signal conductors 320, such that the card edge connector 10 has an improved performance on reducing crosstalk and a common-mode suppression effect, ensuring the higher signal transmission speed of the differential signal conductors 320. The inner side of the mating ends 321 needs to be in electrical contact with the add-in card 910. As a result, except the side to be electrically connected to the add-in card 910, the other three sides of the mating ends 321 in the insulating housing 100 are all shielded. The planar portion 410 has a simple structure and is inexpensive to manufacture. Moreover, the planar portion 410 is easy to be mounted to the first slot 110.

Figure 4D:
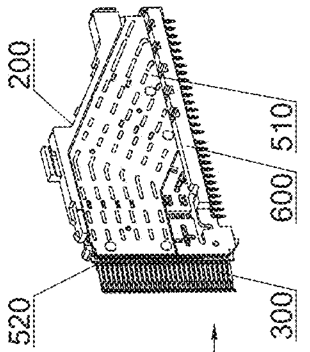
FIGS. 4A-4D are schematic diagrams illustrating a method of manufacturing a subassembly of the card edge connector of FIG. 2.
Figure 4C:
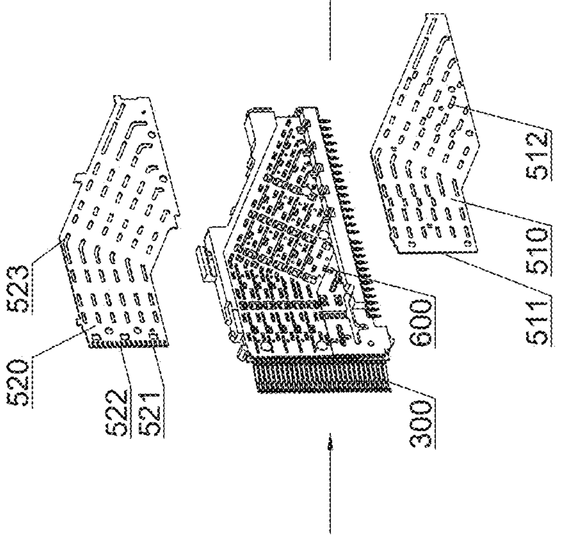
Figure 4B:
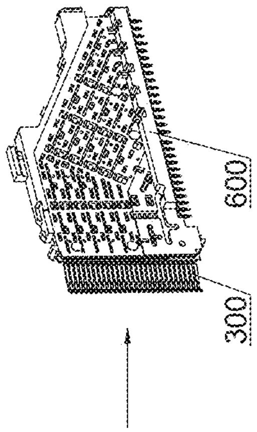

Exemplarily, as shown in FIG. 4B, the subassembly 200 may further comprise the subassembly housing 600 wrapped around the middle portion of the plurality of conductors 300. Referring to FIGS. 4C-4D and 9, the subassembly 200 may further comprise an outer shield 510 covering on the outer side of the subassembly housing 600. The outer shield 510 may be formed from, for example, a metallic material by molding or stamping. The outer shield 510 may be disposed at the outer side of the plurality of conductors 300. The outer shield 510 may be electrically coupled to the ground conductors 310 in the plurality of conductors 300. The planar portion 410 may be in electrical contact with the outer shield 510.

Exemplarily, as shown in FIG. 9, the planar portion 410 of the interface shield 400 may be offset relative to the outer shield 510 toward the outer side of the plurality of conductors 300. Along the transverse direction Y-Y, the planar portion 410 may be disposed at the outer side of the outer shield 510, and the mating ends 301 of the conductors 300 may be disposed at the inner side of the outer shield 510. As can be clearly seen in FIG. 9, the interface shield 400 may include a first portion 401 extending beyond the subassembly housing 600 toward the mating face 101 and a second portion 403, with the subassembly housing 600 between the second portion 403 and the plurality of conductors 300.

The inventors have recognized and appreciated that it is challenging to provide shielding at the first slot 110 of the insulating housing 100 because when the edge of the add-in card is inserted into the first slot 110, the mating ends 301 of the conductors 300 may be bent outwardly under the compression of the edge of the add-in card. The mating ends 301 of the conductors 300 may electrically contact the outer shield 510 if the outer shield 510 extends along its original structure into the first slot 110. This will increase the risk of short-circuiting of the differential signal conductors 320. The planar portion 410 at the outer side of the outer shield 510 may reduce the risk of electrically contacting with the mating ends 301 of the conductors 300, thereby avoiding short-circuiting of the differential signal conductors 320.

Exemplarily, as shown in FIGS. 8-9, the planar portion 410 may have a plurality of beams 411 at the middle portion. The plurality of beams 411 may bend toward the outer shield 510. The plurality of beams 411 may be connected to a body 414 of the planar portion 410 by any suitable methods, such as welding, bonding or molding. Exemplarily, the beams 411 may be formed, for example, by forming U-shaped cuts on the planar portion 410 and then bending them toward the outer shield 510. The beams 411 and the planar portion 410 may be a one-piece member. In order to show the structure of the beam 411, inner and outer sides of the planar portion 410 are shown in FIGS. 8 and 9, respectively. The plurality of beams 411 may have bent portions 411*a*, as shown in FIG. 8. The bent portions 411*a* may abut against and electrically contact the corresponding outer shield 510. It may be convenient for the planar portion 410 to electrically contact with the outer shield 510 by providing the plurality of beams 411. Moreover, when the planar portion 410 is clamped between the insulating housing 100 and the outer shield 510, the plurality of beams 411 may have the tendency to restore to the initial positions, such that the planar portion 410 may be firmly held between the insulating housing 100 and the outer shield 510. Moreover, due to the bent portions 411*a*, it can be ensured that the plurality of beams 411 move more smoothly relative to the outer shield 510, thereby facilitating assembly. This will be described in detail below.

Exemplarily, each beam 411 may be a cantilever beam. Each beam 411 may include, along its extension direction, a bent portion 411*a*, a distal end 411*b*, and a proximal end 411*c*. The bent portion 411*a* may be disposed between the distal end 411*b* and the proximal end 411*c*. The proximal end 411*c* may be connected to the body 414 of the planar portion 410. The distal end 411*b* may be spaced apart from the body 414 so as to be resilient. In one embodiment, a slit may be cut in the body 414 of the planar portion 410, and the portion surrounded by the slit is bent to form the beam 411 in an opening 413. The proximal end 411*c* may be connected to one end of the opening 413. The distal end 411*b* may be spaced apart from the other end of the opening 413. The distal end 411*b* is closer to the mating face 101 relative to the bent portion 411*a* of the corresponding beam 411. During assembly, the planar portion 410 is first inserted from the rear side of the insulating housing 100 in the direction toward the mating face 101, and then the subassemblies 200 are inserted. The beam 411 with the above structure is more conducive to the assembly.

Exemplarily, as shown in FIGS. 8-9, the planar portion 410 is further provided with a plurality of first projections 412. The plurality of first projections 412 may be connected to the body 414. The body 414 may have a front edge 415 facing the mating face 101. The plurality of first projections 412 may extend from the front edge 415 toward the mating face 101. For example, the plurality of first projections 412 may extend forward to the mating ends 301 of the conductors 300. The plurality of first projections 412 may serve as extensions of the planar portion 410 to further improve a shielding effect. The plurality of first projections 412 may be integral with the planar portion 410. The plurality of first projections 412 extend substantially forward, such that although the plurality of first projections 412 are closer to the mating ends 301 along the forwarding direction compared to the body 414, since the mating ends 301 are bent toward the first slot 110, there can be sufficient space between the planar portion 410 and the mating ends 301 without making the planar portion 410 in electrical contact with the mating ends 301, even if the add-in card 910 is inserted into the first slot 110 to cause the mating ends 301 to tilt toward the outer side. Exemplarily, the front ends of the first projections 412 preferably do not extend beyond the bents of the mating ends 301, i.e., the front ends of the first projections 412 are preferably disposed behind the bents of the mating ends 301, wherein the bents of the mating ends 301 are the portions that are in electrical contact with the add-in card 910.

Exemplarily, as shown in FIG. 10, the insulating housing 100 may be provided with a plurality of grooves 120. The openings of the plurality of grooves 120 may be back to the mating face 101. In the embodiments in which the insulating housing 100 is provided with the third slot 140, the openings of the plurality of grooves 120 may be connected to the interface shield planar portion mounting slot 140. As shown in FIGS. 8-9, the plurality of first projections 412 may be one-to-one correspondingly inserted into the plurality of grooves 120. In this way, the planar portion 410 may be more securely fixed. The planar portion 410 may be pre-fixedly disposed in the insulating housing 100, and then the outer shield 510 is inserted into the insulating housing 100. Optionally, the planar portion 410 may also be pre-contacted electrically with the outer shield 510 and then inserted into the insulating housing 100.

Exemplarily, as shown in FIG. 4C, the subassembly 200 may further include an inner shield 520. The inner shield 520 may be formed from, for example, a metallic material, by molding or stamping. The inner shield 520 may be disposed at the inner side of the middle portions of the plurality of conductors 300. Exemplarily, the inner shield 520 may cover the inner side of the subassembly housing 600. The inner shield 520 may be electrically coupled to the ground conductors 310 in the plurality of conductors 300. A front portion 521 of the inner shield 520 facing the mating face 101 may extend into the first slot 110. The inner shield 520 may be disposed at the inner side of the mating ends of the plurality of conductors 300, such that the transmission path of the card edge connector 10 can be shielded at the first slot 110. In this way, signal transmission speed can be increased and signal integrity is improved.

Exemplarily, as shown in FIG. 4C, the front portion 521 of the inner shield 520 may have a plurality of second projections 522. Along the longitudinal direction X-X, the plurality of second projections 552 may be disposed in one-to-one correspondence with the ground conductors 310 and the plurality of differential signal conductors 320 spaced apart by the ground conductors 310 in the plurality of conductors 300. The extension distance of the inner shield 520 can be increased by the plurality of second projections 522, thereby further improving the shielding effect.

Exemplarily, as shown in FIG. 9, in the embodiments in which the subassembly 200 further comprises the outer shield 510, along the transverse direction Y-Y, the plurality of conductors 300 may be disposed between the outer shield 510 and the inner shield 520. The front portion 521 of the inner shield 520 may protrude beyond the front portion 511 of the outer shield 510 along a direction toward the mating face 101. When the edge of the add-in card is inserted into the first slot 110, the mating ends 301 of the conductors 300 may move outwardly under the compression of the edge of the add-in card 910 and therefore move away from the inner shield 520. Appropriately increasing the extension distance of the inner shield 520 can further improve the shielding effect.

Figure 12:
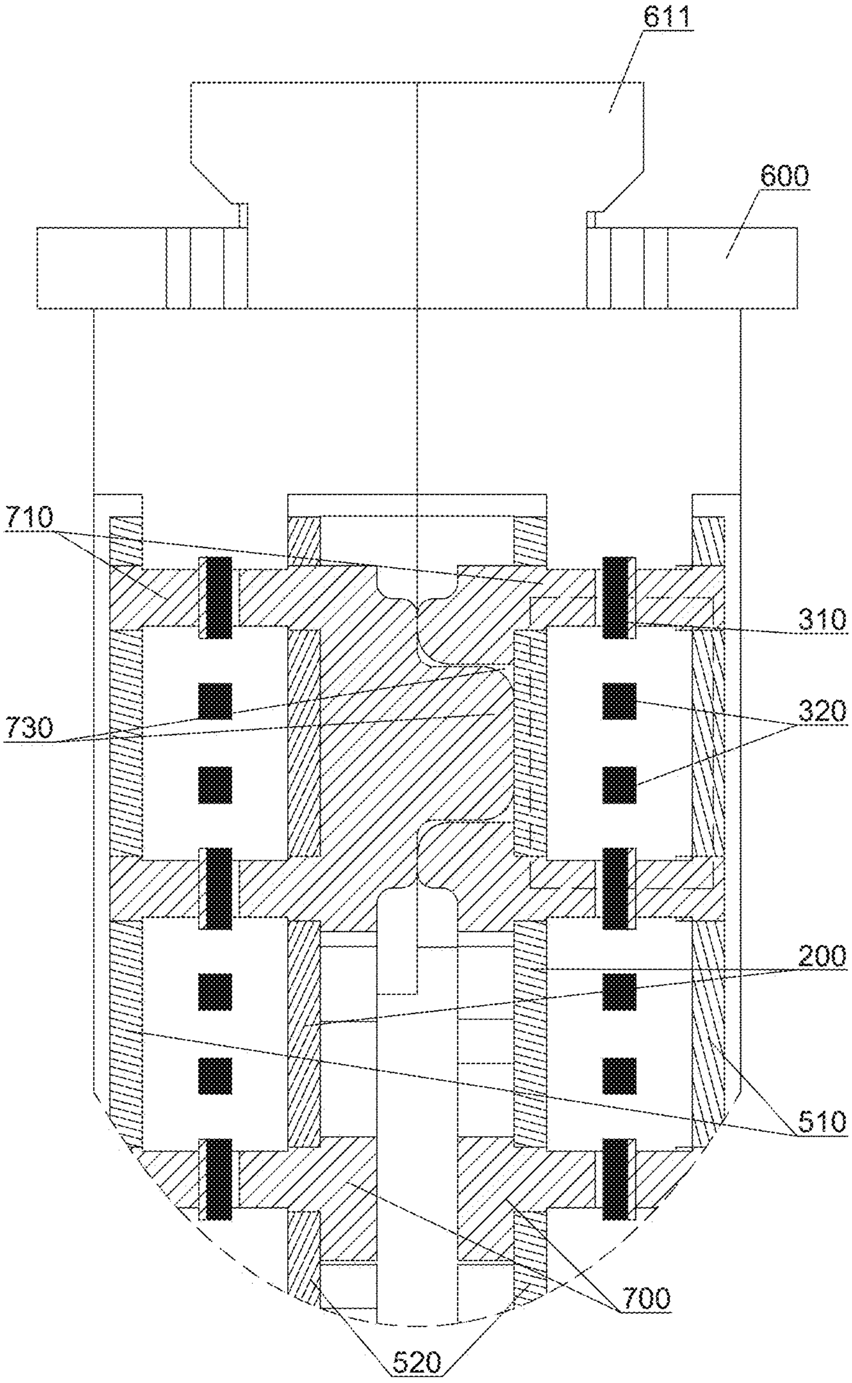
FIG. 12 is a partially enlarged view of the card edge connector of FIG. 11.

In other embodiments, as shown in FIGS. 2-3 and 9, the subassembly 200 may further include shielding frames. The shielding frame may comprise one or more shielding members including but not limited to the interface shield 400, the outer shield 510, the inner shield 520, and/or a lossy member 700 (which will be described in more details below). In some embodiments, the inner shield 520, the outer shield 510 and the lossy member 700 that passes through the ground conductors 310 to connect both the inner shield 520 and the outer shield 510 to the ground conductors 310 may form the shielding frame as shown by the dashed box in FIG. 12. With this configuration, the shielding frame has a simple structure and is inexpensive to manufacture. Each pair of differential signal conductors 320 may pass through the shielding frame along the length direction thereof (i.e., the direction from the mating ends 321 to the mounting tails 322). The shielding frame may be electrically coupled to the ground conductors 310. In this way, the shielding frame may enclosure around at least a portion of the corresponding differential signal conductors 320 along that length direction. Said at least the portion may include ¼, ½, ¾, or more of that length. The shielding frame may be disposed outside of the first slot 110.

The shielding frames may provide full shielding for each pair of the differential signal conductors 320 in the length direction. In this way, signal transmission speed and signal integrity can be enhanced prominently. Thus, the card edge connector 10 provided by the embodiments of the present disclosure can have better electrical performances, thereby making the electronic system faster and functionally more complicated.

Exemplarily, as shown in FIGS. 2-3, 7A-7B and 9, the subassemblies 200 each may also include lossy members 700. The lossy members 700 may be electrically coupled between the ground conductors 310 and the inner shield 520. Further, the lossy members 700 may be electrically coupled between the ground conductors 310 and the outer shield 510.

Exemplarily, the lossy members 700 may be made of a lossy material. Materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within grounding members of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz or 1 GHz to 5 GHz. Alternatively, lossy material may be identified from measurements made at a single frequency, such as 10 GHz or 15 GHz.

Loss may result from interaction of an electric field component of electromagnetic energy with the material, in which case the material may be termed electrically lossy. Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The "electric loss tangent" is the ratio of the imaginary part to the real part of the complex electrical permittivity of the material.

Electrically lossy materials can also be formed from materials that are generally thought of as conductors, but are relatively poor conductors over the frequency range of interest. These materials may conduct, but with some loss, over the frequency range of interest such that the material conducts more poorly than conductors of an electrical connector, but better than an insulator used in the connector. Such materials may contain conductive particles or regions that are sufficiently dispersed that they do not provide high conductivity or otherwise are prepared with properties that lead to a relatively weak bulk conductivity compared to a good conductor such as pure copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000 Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy member need not have uniform properties over its entire volume. A lossy member, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy member may be formed by molding or otherwise shaping the binder with filler into a desired form. The lossy material may be molded over and/or through openings in conductors, which may be ground conductors or shields of the connector. Molding lossy material over or through openings in conductors may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two shot molding operation. The lossy material may press against or be positioned sufficiently near a ground conductor that there is appreciable coupling to a ground conductor. Intimate contact is not a requirement for electrical coupling between lossy material and conductors, as sufficient electrical coupling, such as capacitive coupling, between a lossy member and conductors may yield the desired result. For example, in some scenarios, 100 pF of coupling between a lossy member and a ground conductor may provide an appreciable impact on the suppression of resonance in the ground conductor. In other examples with frequencies in the range of approximately 10 GHz or higher, a reduction in the amount of electromagnetic energy in conductors may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to conductors, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 30% by volume. The amount of filler may impact the conducting properties of the material, and the volume percentage of filler may be lower in this range to provide sufficient loss.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical magnetically lossy materials or mixtures containing magnetically lossy materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

Lossy portions also may be formed in a number of ways. In some examples the binder material, with fillers, may be molded into a desired shape and then set in that shape. In other examples the binder material may be formed into a sheet or other shape, from which a lossy member of a desired shape may be cut. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

Resonance in the ground conductors 310 may be effectively suppressed by manufacturing the lossy member 700 with the lossy material, so that shielding is formed between adjacent signal conductors or adjacent pairs of signal conductors, thereby preventing signals carried on one signal conductor 320 from creating crosstalk on the other signal conductor 320. Therefore, signal interferences may be reduced by suppressing resonance, and thereby signal transmission speed and signal integrity can be effectively improved. Shielding may also have effect on impedance of each conductor 300, which may further contribute to achieving the desired electrical property.

Exemplarily, as shown in FIGS. 2-3, 7A-7B, and 11-12, the subassemblies 200 may be disposed in pairs with each pair of subassemblies opposite to each other about the first slot 110. Along the transverse direction Y-Y, the subassemblies 200 are disposed on both sides of the first slot 110, respectively. For each pair of subassemblies 200, two third conductive members 520 may face each other between the pair of subassemblies 200. For each subassembly 200, the lossy member 700 may form an engaging portion 730 at the inner side of the inner shield 520. The engaging portions 730 of each pair of subassemblies 200 may be connected to each other. In the embodiments as shown in the drawings, the engaging portions 730 of each pair of subassemblies 200 may comprise a bulge and a recess, respectively. The bulge may be inserted into the recess to achieve the engagement. With this configuration, each pair of subassemblies 200 can be fixed together.

Figure 7A:
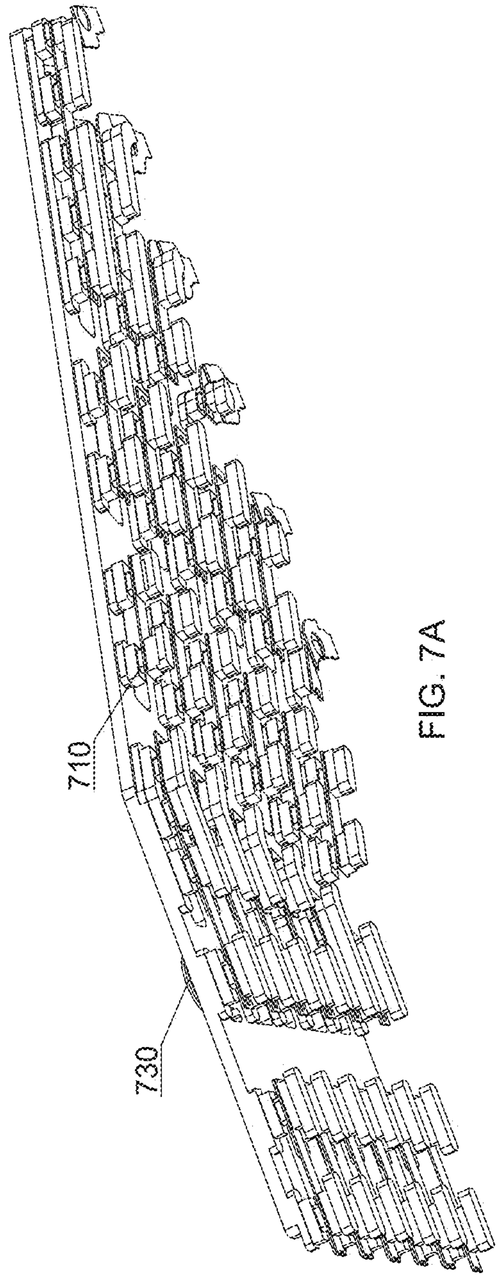
FIGS. 7A-7B are perspective views of a lossy member of FIG. 3.
Figure 7B:
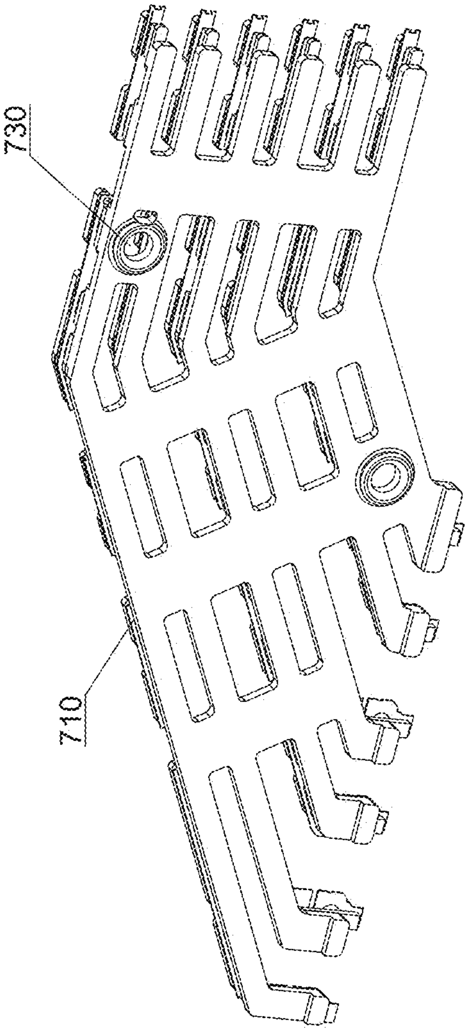

Exemplarily, as shown in FIGS. 6 and 7A-7B, the ground conductors 310 may be provided with first openings 313. The first openings 313 may have any suitable number and shape. The lossy member 700 passing through the first openings 313 in any adjacent two ground conductors 310 may be electrically connected to the inner shield 520 and the outer shield 510 so as to form the shielding frame together with the inner shield 520 and the outer shield 510. The lossy member 700 forms protrusions 710 in the first openings 313. In some embodiments, the lossy member 700 is formed by injection molding onto the inner shield 520, the subassembly housing 600 wrapped around the plurality of conductors 300 and the outer shield 510 stacked together. The inner shield 520, the conductors 300, the subassembly housing 600 and the outer shield 510 are all provided with openings at corresponding positions, and the lossy material can pass through the openings to form the protrusions 710. For each shielding frame, the corresponding differential signal conductors 320 may pass through in pair, such that shielding can be formed in the length direction of the differential signal conductors 320 and the whole transmission path of the card edge connector 10 can be well shielded. In this way, the signal transmission speed can be improved and the signal integrity becomes better. Thus, the card edge connector 10 provided by the embodiments of the present disclosure may have a better electrical performance, leading to a faster and functionally more complicated electronic system.

Exemplarily, there may be a plurality of the shielding frames. The shielding frames may be spaced apart along the length direction of the differential signal conductor pairs. In this way, shielding effect can be further improved.

Figure 4A:
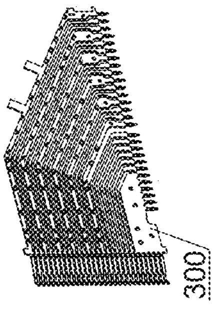

FIGS. 4A-4D show a method of manufacturing a subassembly 200. As shown in FIGS. 4A-4B, firstly, the subassembly housing 600 may be injection molded onto the plurality of conductors 300. The subassembly housing 600 may support and hold the conductors 300 in position. In some embodiments, prior to forming the subassembly housing 600, the plurality of conductors 300 as shown in FIG. 4A may be connected together at the edges thereof by a lead frame at the periphery of these conductors 300 to make the plurality of conductors 300 as a whole piece. The lead frame can be made of the same material as the conductors 300. The whole piece may be stamped or cut from a metal sheet, according to some embodiments. Metals used for the whole piece can include, but are not limited to, copper or copper alloys, such as phosphor-bronze, chrome-plated copper, or beryllium copper, or aluminum, chrome-plated aluminum, aluminum alloys, etc. During or after the molding of the subassembly housing 600, the lead frame may be cut and/or removed to electrically isolate one or more of the plurality of conductors 300.

As shown in FIG. 4C, the outer shield 510 and the inner shield 520 may be provided on both sides of the above component, respectively. A plurality of second openings 512 and a plurality of third openings 523 may be disposed in the outer shield 510 and the inner shield 520 along the length direction of the ground conductor 310, respectively. The plurality of second openings 512 and the plurality of third openings 523 may be aligned with the first openings 313 on the ground conductor 310. Moreover, when the subassembly housing 600 is injection molded as described above, the subassembly housing 600 exposes the first openings 313. Then, as shown in FIG. 4D, a lossy material may be over-molded onto the components formed as shown in FIG. 4C, and the lossy material passes through the first openings 313, the second openings 512, and the third openings 523, and forms the lossy member 700.

Figures 5A, 5B, 5C:
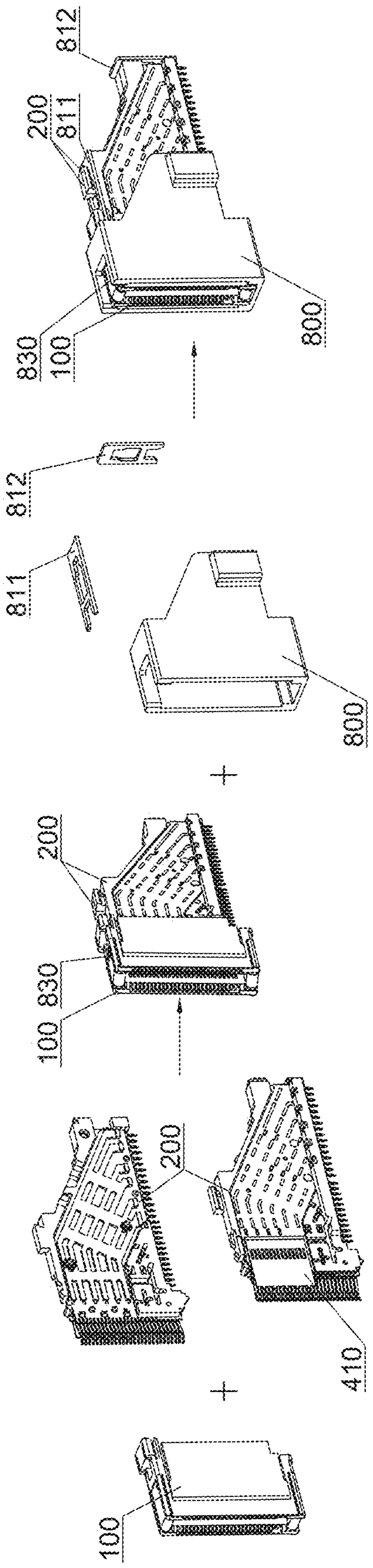
FIGS. 5A-5C are schematic diagrams illustrating a method of manufacturing the card edge connector of FIG. 2.

Next, as shown in FIGS. 5A-5C, the second conductive members 510 of the two subassemblies 200 may be disposed facing outwardly and the subassemblies 200 may be inserted into the insulating housing 100. The two subassemblies 200 and the insulating housing 100 may be fixed together by the first retainer 811. The shell 800 may then be assembled to the above components. The shell 800 may preferably be made of materials with higher strength, such as metal. The shell 800 may serve to protect the internal components from being damaged by an external force. Before or after the connection of the first retainer 811, the two subassemblies 200 may be fixed together with a second retainer 812. Optionally, this method is exemplary, and any other suitable method may be used to manufacture the card edge connector 10.

Exemplarily, a third securing portion 612 may be provided at the rear portion of each subassembly 200, as shown in FIG. 9. The second retainer 812 may be clamped to the third securing portion 612 along the longitudinal direction X-X. With this configuration, the two subassemblies 200 may be fixed to each other. Exemplarily, the card edge connector 10 may further comprise a pair of clips 830, as shown in FIGS. 2-3. Each clip 830 may be U-shaped. The pair of clips 830 may be secured to two sides of the first slot 110 opposite along the longitudinal direction X-X. The pair of clips 830 may be used for securing the insulating housing 100 and the shell 800 together.

Having thus described several aspects of several embodiments, it is to be appreciated that various alterations, modifications, and improvements will readily occur to those skilled in the art. Such alterations, modifications, and improvements are intended to be part of this disclosure and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

For example, the first conductive member and/or shielding frame described above can be used in any suitable connector, such as a backplane connector, a daughter card connector, a stacking connector, a Mezzanine connector, an I/O connector, a chip socket, a Gen Z connector, etc. When these connectors need to transmit data using high-speed data channels, the first conductive member and/or shielding frame can improve signal transmission quality and reduce crosstalk, and signal integrity can be improved.

As another example, although many creative aspects have been described above with reference to right angle connectors, it should be understood that the aspects of the present disclosure are not limited to these. Any one of the creative features, whether alone or combined with one or more other creative features, can also be used for other types of electrical connectors, such as coplanar connectors, etc.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like are shown based on the accompanying drawings, for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value. For example, a phrase "between about 10 and about 20" is intended to mean "between exactly 10 and exactly 20" in some embodiments, as well as "between 10±d1 and 20±d2" in some embodiments. The amount of variation d1, d2 for a value may be less than 5% of the value in some embodiments, less than 10% of the value in some embodiments, and yet less than 20% of the value in some embodiments. In embodiments where a large range of values is given, e.g., a range including two or more orders of magnitude, the amount of variation d1, d2 for a value could be as high as 50%. For example, if an operable range extends from 2 to 200, "approximately 80" may encompass values between 40 and 120 and the range may be as large as between 1 and 300. When only exact values are intended, the term "exactly" is used, e.g., "between exactly 2 and exactly 200." The term "essentially" is used to indicate that values are the same or at a target value or condition to within ±3%.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. For example, a process, method, system, product or device that contains a series of steps or units need not be limited to those steps or units that are clearly listed, instead, it may include other steps or units that are not clearly listed or are inherent to these processes, methods, products or devices. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

In the claims, as well as in the specification above, use of ordinal terms such as "first," "second," "third," etc. does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. An electrical connector, comprising:

a housing comprising a first slot at a mating face; and a subassembly partially disposed in the housing, the subassembly comprising a subassembly housing, a plurality of conductors held by the subassembly housing, and a first conductive member separate from the first slot of the housing, wherein:

each of the plurality of conductors comprises a mating end extending beyond the subassembly housing toward the mating face; and the first conductive member has a first portion extending beyond the subassembly housing toward the mating face and a second portion, with the subassembly housing between the second portion of the first conductive member and the plurality of conductors.

2. The electrical connector of claim 1, comprising:

a second conductive member disposed on the subassembly housing, wherein the second conductive member is between the second portion of the first conductive member and the subassembly housing, and the first portion of the first conductive member extends beyond the second conductive member toward the mating face.

3. The electrical connector of claim 2, wherein:

the first conductive member is coupled to the second conductive member.

4. The electrical connector of claim 3, wherein:

the first conductive member comprises a body and a plurality of beams; and each of the plurality of beams comprises a proximal end connected to the body and a portion extending toward the second conductive member such that the first conductive member is offset from the second conductive member in a transverse direction.

5. The electrical connector of claim 4, wherein:

the plurality of beams abut the second conductive member and electrically connect the first conductive member and the second conductive member.

6. The electrical connector of claim 4, wherein:

each of the plurality of beams comprises a distal end disposed closer to the mating face than the proximal end.

7. The electrical connector of claim 1, wherein:

the first conductive member comprises a plurality of projections extending toward the mating face.

8. The electrical connector of claim 1, wherein the housing comprises a second slot extending from the first slot and holding a portion of the subassembly housing, a plurality of channels disposed on opposite sides of the first slot and at least partially holding the mating ends of the plurality of conductors, and a third slot separate from the first slot by the plurality of channels and is configured to receive the first portion of the first conductive member.

9. The electrical connector of claim 2, comprising:

a third conductive member disposed on the subassembly housing and extending into the first slot.

10. The electrical connector of claim 9, comprising:

a lossy member coupling the third conductive member to the second conductive member.

11. A connector subassembly, comprising:

a subassembly housing;

a plurality of conductors held by the subassembly housing, each of the plurality of conductors comprising a mating end extending out of the subassembly housing;

a first conductive member; and a second conductive member disposed between the subassembly housing and the first conductive member, the second conductive member coupled to the first conductive member, wherein the first conductive member extends beyond the second conductive member toward the mating ends of the plurality of conductors.

12. The connector subassembly of claim 11, wherein:

the plurality of conductors comprise a plurality of pairs of differential signal conductors and a plurality of ground conductors disposed between adjacent pairs of differential signal conductors; and the connector subassembly comprises a lossy member coupling the second conductive member to the plurality of ground conductors.

13. The connector subassembly of claim 12, comprising:

a third conductive member disposed on the subassembly housing and separate from the second conductive member by the subassembly housing, wherein:

each of the plurality of ground conductors comprises a plurality of openings; and the lossy member extends through the plurality of openings of each of the plurality of ground conductors to couple the third conductive member to the second conductive member.

14. The connector subassembly of claim 13, wherein:
the first conductive member comprises a planar portion parallel to the second conductive member and offset from the second conductive member in a transverse direction.

15. The connector subassembly of claim 12, wherein:
the plurality of conductors comprises a single ended conductor.

16. The connector subassembly of claim 12, wherein:
each of the plurality of conductors comprises a mounting tail opposite the mating end; and
the mounting tails of the plurality of pairs of differential signal conductors are shorter than the mounting tails of the plurality of ground conductors.

17. An electrical connector, comprising:
a housing comprising a slot;
a pair of subassemblies partially disposed in the housing, each subassembly of the pair of subassemblies comprising a plurality of conductors, each of the plurality of conductors comprising a mating end curving into the slot; and
a pair of first conductive members disposed in the housing, with the pair of subassemblies disposed between the pair of first conductive members.

18. The electrical connector of claim 17, wherein:
each subassembly of the pair of subassemblies comprises:
a subassembly housing,
second and third conductive members disposed on opposite sides of the subassembly housing, and
a lossy member disposed on the third conductive member and comprising portions extending through the third conductive member to the second conductive member; and
the pair of subassemblies are disposed with the lossy members facing each other.

19. The electrical connector of claim 18, wherein each first conductive member of the pair of first conductive members comprises
a planar portion parallel to the second conductive member and offset from the second conductive member in a transverse direction, and
a plurality of beams extending from the planar portion toward the second conductive member of a respective one of the pair of subassemblies.

20. The electrical connector of claim 17, comprising:
a shell disposed outside the housing and extending beyond the housing in a direction away from the slot of the housing.

* * * * *